United States Patent
Abe et al.

(10) Patent No.: US 8,347,209 B2
(45) Date of Patent: Jan. 1, 2013

(54) STRUCTURED DOCUMENT DRAWING SYSTEM, AND METHOD AND PROGRAM THEREFOR

(75) Inventors: Naoya Abe, Yamaguchi (JP); Katsuki Yoshimura, Yamaguchi (JP)

(73) Assignees: Kathenas Co., Ltd., Tokyo (JP); NTT Data Institute of Data Management Consulting, Inc., Tokyo (JP)

( * ) Notice: Subject to any disclaimer, the term of this patent is extended or adjusted under 35 U.S.C. 154(b) by 316 days.

(21) Appl. No.: 12/741,294

(22) PCT Filed: Nov. 5, 2008

(86) PCT No.: PCT/JP2008/070082
§ 371 (c)(1),
(2), (4) Date: Jun. 7, 2010

(87) PCT Pub. No.: WO2009/060846
PCT Pub. Date: May 14, 2009

(65) Prior Publication Data
US 2010/0265256 A1    Oct. 21, 2010

(30) Foreign Application Priority Data
Nov. 7, 2007  (JP) ................................ 2007-290050

(51) Int. Cl.
*G06F 17/00*   (2006.01)
(52) U.S. Cl. ....................... 715/236; 715/235
(58) Field of Classification Search .................. 715/235, 715/236, 238, 239
See application file for complete search history.

(56) References Cited

FOREIGN PATENT DOCUMENTS
JP      07-056898       3/1995
JP      2005-527057 A   9/2005

OTHER PUBLICATIONS

Eric A. Meyer, CSS Kanzen Guide $2^{nd}$ edition, O'Reilly Japan, Inc., Tim O'Reilly, Jun. 27, 2005 , pp. 111 to 117.
Tatsuo Watanabe, HTML Handbook, revised $2^{nd}$ edition, Softbank Corp., Oct. 1, 1998, pp. 135 to 136.
XML Inclusions (XInclude) Version 1.0 [online], W3C, Dec. 20, 2004, [retrieval date Jan. 5, 2009], Internet<URL:http://www.w3.org/TR/2004/REC-xinclude-20041220/>.
Eric A. Meyer, CSS Kanzen Guide 2nd edition, O'Reilly Japan, Inc., Tim O'Reilly, Jun. 27, 2005, pp. 111 to 117.
Tatsuo Watanabe, HTML Handbook, revised 2nd edition, Softbank Corp., Oct. 1, 1998, pp. 135 to 136.
Office Action in corresponding Chinese application No. 200880122539.7, Mailed Sep. 8, 2011, six pages.

*Primary Examiner* — Adam M Queler
(74) *Attorney, Agent, or Firm* — Harness, Dickey & Pierce, PLC

(57) ABSTRACT

According to the present invention, when a style relating to a dimension of all elements included in a subtree of a structured document is set in a relative unit, all these elements can be displayed in the same style. The user terminal 100 allocates a drawing area to each key when drawing each key configuring a key string of a tree structure, determines a root of a subtree to which a specific key belongs when a style whose format relating to dimension is expressed in the relative unit is set to the key, and converts the style expressed in the relative unit into an absolute unit with the drawing area allocated to the root of the subtree as reference and draws the key according to style expressed in the absolute unit.

7 Claims, 20 Drawing Sheets

```
K("_Calc2") {
  Se {
    @label {
      ~fontsize=10%; ~border=1%;
      ~base region = "page";
    }
    @button {
      ~key = "Rb+Cb"  ~border = 3%;
      ~fontsize=5%;  ~padding=10%;
      ~margin=10%;
      ~base region = "thisks";
    }
  }
  U {
    R("0", @label)
    R4(@button) {
      C3 {
        I("http://server/kbd ks");
      }
      C {
        Rb("AC")  Rb("CLEAR")  Rb2("=")
      }
    }
  }
}
```

FIG. 1

STYLE STORAGE UNIT 153

| STYLE SET NAME | TARGET OF STYLE APPLICATION | VALUE |
|---|---|---|
| @label | me~fontsize | 10% |
| @label | me~border | 1% |
| @label | me~base~region | page |
| @button | Rb~fontsize | 18% |
| @button | Rb~border | 3% |
| @button | Rb~margin | 10% |
| @button | Rb~padding | 10% |
| @button | Rb~base~region | thisks |
| @button | Cb~fontsize | 18% |
| @button | Cb~border | 3% |
| @button | Cb~margin | 10% |
| @button | Cb~padding | 10% |
| @button | Cb~base~region | thisks |
| DEFAULT | all~fontsize | 10pt |
| DEFAULT | all~border | 0pt |
| DEFAULT | all~margin | 0pt |
| DEFAULT | all~padding | 0pt |
| DEFAULT | all~base~region | me |
| DEFAULT | Rb~border | 3pt |
| DEFAULT | Cb~border | 3pt |

FIG. 8

| STYLE SET NAME | KEY ID |
|---|---|
| @label | k00006 |
| @button | k00007 |

STRUCTURED DOCUMENT DRAWING SYSTEM, AND METHOD AND PROGRAM THEREFOR

TECHNICAL FIELD

The present invention relates to a structured document drawing system, and method and program for structured drawing.

BACKGROUND ART

HTML (Hyper Text Markup Language) is well known as display description language. HTML defines the sentence structure and decoration of character strings by use of tags. A webpage written in HTML is interpreted by the web browser to be drawn on a screen. Styles indicating how to draw various elements such as a character string, an image, a button, a textbox and the like can be written as a style sheet in HTML. Styles of tags specified by selectors, the selectors being statements that specify element names, classes, and the like, are written in the style sheet in association with the selectors.

The size of a screen provided by the web browser varies with clients and there is a need to display in the same manner regardless of whatever types of the screen used for the output. In response to this, there is proposed, for example, a mechanism of applying a style sheet of the client side to fit the width of a document to the width of the display portion, in Patent Citation 1.

Patent Citation 1
Japanese Patent Application Laid-open Publication No. 2005-527057

DISCLOSURE OF INVENTION

Problems to be Solved by the Invention

By the way, in the style sheet, the dimension of an element in a relative unit such as percentages (%) or pixels (px) can be specified for a style that sets the width and height of an element. The dimension is determined in accordance with the size of the element's parent when the style is specified in the relative unit. In this case, the child element of a specific element is displayed in the same size, relatively, regardless of the screen size.

However, when there is a desire to set the same style to the entire subtree that is a part of the tree structure of the structured document, and the style of each element included in the subtree is specified in a relative unit, the reference used for calculating the dimension would differ according to the level thus varying the style according to the level.

The present invention has been made in view of the aforementioned background and an object thereof is to provide a structured document drawing system and method and program therefor that can display all elements included in a subtree of a structured document in the same style when a style relating to the dimension is set in a relative unit to all these elements.

Means for Solving the Problems

The invention described in claim 1 of the present inventions for solving the above described problem is, a system for drawing a structured document in a tree structure, including an area determining portion that allocates a drawing area to each element configuring the structured document; a reference element determining portion that determines a second element to be a root of a subtree to which a first element belongs, when a first style is set to the first element, the first style expressing a format relating to a dimension in a relative unit; a drawing style calculating portion that calculates a second style expressing the first style in an absolute unit on basis of the drawing area allocated to the second element; and an element drawing portion that draws the first element according to the second style.

According to the structured document drawing system of the present invention, when the style of a specific element is specified in a relative unit, the style can be converted to an absolute unit on basis of the root of the subtree to which the element belongs. In this way, with regard to the elements to which the style is specified in the relative unit, the style can be converted on basis of the same root. Therefore, when elements, whose styles in the relative unit have the same value, belong to the same subtree, can be applied styles with the same value. Thus even if a style is applied in the relative unit, the style applied to the elements within a subtree can be unified.

The invention described in claim 2 of the present inventions for solving the above described problem is, the structured document drawing system according to claim 1, wherein the first style is at least one of a line width to draw a graphic that expresses the first element, a margin to draw the graphic inside the drawing area, a padding to draw a text inside the graphic, and font size to draw the text.

The invention described in claim 3 of the present inventions for solving the above described problem is, the structured document drawing system according to claim 1, wherein the reference element determining portion determines a root of the structured document as the second element.

The invention described in claim 4 of the present inventions for solving the above described problem is, the structured document drawing system according to claim 1 further comprising: a structured document storing portion that stores first structured document; a document acquiring portion that acquires a second structured document when the second structured document is specified to an attribute of the first element included in the first structured document; a document linking portion that links the second structured document to the first structured document to generate the structured document to be a target of drawing, so that a root element of the second structured document becomes a child element of the first element.

The invention described in claim 5 of the present inventions for solving the above described problem is, the structured document drawing system according to claim 4, wherein the reference element determining portion determines a root of the first structured document as the second element when the first element is included in the first structured document, and determines a root of the second structured document as the second element when the first element is included in the second structured document.

Other problems disclosed in the present specification and solutions therefor will become clear from the following description of the embodiments and the accompanying drawings.

Advantageous Effects

According to the present invention, when a style relating to the dimension is set in a relative unit to all the elements included in the subtree of the structured document, all the elements can be displayed in the same style.

BRIEF DESCRIPTION OF THE DRAWINGS

FIG. 1 is a view illustrating an example of a key set file 10.
FIG. 8 is a view illustrating a configuration example of a style storage unit 153.

BEST MODE FOR CARRYING OUT THE INVENTION

Figure 2:
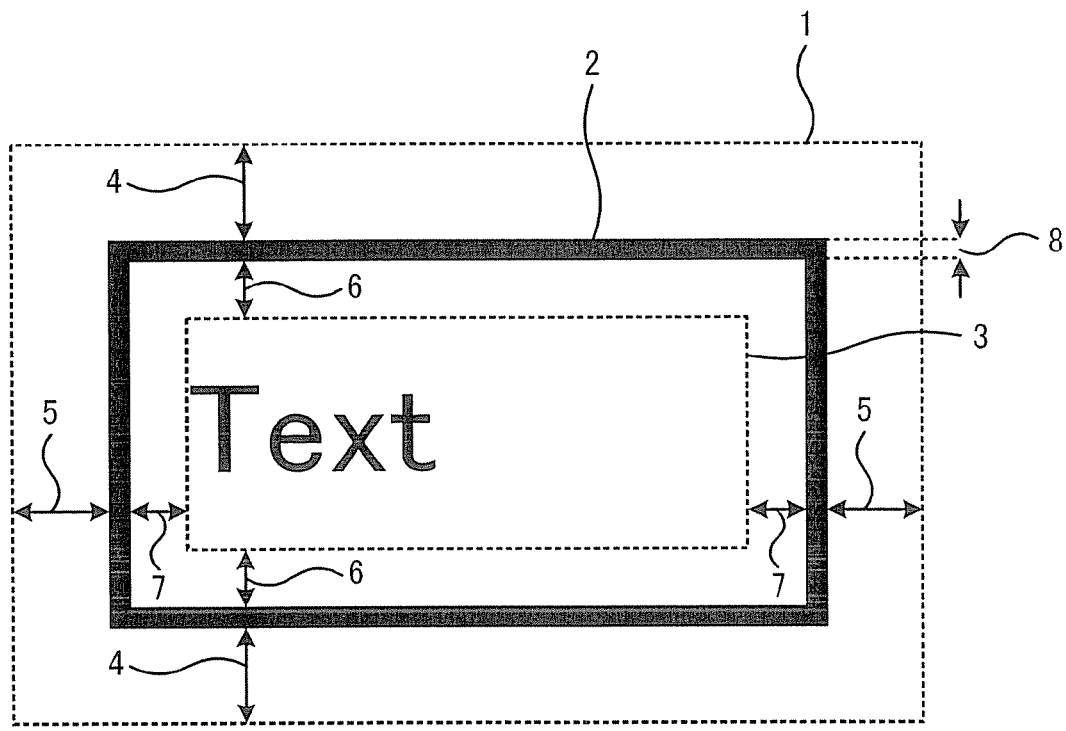
FIG. 2 is a view explaining a style applied to draw a key.

In the following description, an embodiment of the present invention relating to a drawing system for a structured document will be described. The drawing system according to the present embodiment is for drawing a structured document in which elements to be drawn on a screen are written in a tree structure. In the present embodiment, the nodes that configure the tree structure are referred to as keys. And a group including a plurality of keys is called a key set. A structured document in which each key set is described is referred to as a key set file. Further, in the present embodiment, elements have character strings drawn inside a rectangular or an oval shape for the purpose of simplifying the explanation however, it is a matter of course that general images or graphics can be drawn as elements.

FIG. 1 is a view illustrating an example of a key set file. As shown in FIG. 1, in the key set file 10, the key set is expressed by data (hereinafter referred to as key string) in which keys are written in the depth-first order following a label indicating a key as the root of the tree structure and keys in the same level are put together in parentheses (braces).

As labels (element name) of the keys, there are "K", "Se", "U", "R", "Rb", "C", "Cb" and the like. As will be described later, a drawing area of a key is determined according to the label. Keys that are labeled as R, Rb, C, or Cb are assigned a divided area of the parent's drawing area, the key with Se label is not assigned a drawing area, and the other keys are assigned the parent's drawing area as it is.

Label "K" indicates a key to be the root of the key set. The key labeled K (hereinafter referred to as the K key) is set the name of the key set (hereinafter referred to as the key set name) as an attribute. The attribute of the key is written in parentheses following the label. In the example of the key set file 10, the K key 11 is written as "K("_Calc2")." This indicates that the key set name of "_Calc2" is set as the attribute of K key 11.

Label "Se" indicates a key for setting a drawing attribute (referred to as style) that sets how the key is to be drawn. Note that in the present embodiment, the style applied to a key relates to only the dimensions of various kinds for the purpose of simplifying the explanation.

FIG. 2 is a view explaining a style applied to draw a key. In the present embodiment, graphic 2 is drawn with a line of width 8 in the drawing area 1, and the content (text 3 in the example of FIG. 2 however, this can be an image or a graphic) of the key is drawn inside graphic 2, as shown in FIG. 2. There is space (margin) between the boundary of drawing area 1 and graphic 2, and there is also space (padding) between the graphic 2 and the text 3. Note that in the present embodiment the size of margin 4 in the lateral direction of the screen and margin 5 in the vertical direction of the screen are the same, and the size of padding 6 in lateral direction of the screen and padding 7 in the vertical direction of the screen are the same for the purpose of simplifying the explanation.

In the present embodiment, there are four types of styles being the width 8 of a line for drawing graphic 2 (hereinafter referred to as border), size of margins 4 and 5 (hereinafter referred to as simply margin), font size for drawing character string 3, and size of paddings 6 and 7 (hereinafter referred to as simply padding) however, various types of styles, such as the foreground color or background color can be set to the style.

Following the key labeled Se (hereinafter referred to as the style key), a style setting is written in the parentheses. The style setting is written in a form that the name (hereinafter referred to as style name) of the style which is to be the setting item and its value (hereafter referred to as style value) are associated by "=" (for example, described as "~border=1%", hereafter referred to as style description sentence), in associated with the name (hereinafter style set name) of a group (hereinafter referred to as style set) of one or more styles. And a semicolon (;) is written at the end of a style description sentence.

The style name of a border is "~border." The style name of a margin is "~margin." The style name of a font size is "~fontsize." The style name of padding is "~padding."

The style value of a style configured in the present embodiment is a numerical value expressed in an absolute unit or a relative unit. The absolute unit is a unit for directly specifying a size, such as, centimeter (cm), millimeter (mm), inch (in), point (pt) and the like. On the other hand, the relative unit is a unit for specifying a size relative to a certain reference size, for example, percentage (%) indicating a relative value with respect to a certain value, height (ex) of character "x" of a specific font with a specific font size, pixel (px) that is a relative value with respect to a display resolution, and the like.

For the purpose of simplifying the explanation, the absolute unit is in points (pt) and the relative unit is in percentage (%) in the present embodiment.

In the example of the key set file 10 of FIG. 1, in the Se key 12, two style sets 13, 14 are written as child elements of the Se key 12. The style set 13 with a style set name "@label" attached is specified to have the font size of "10%" and the border of "1%".

In the example of key set file 10, a margin and a padding are not specified in the style set 13 however, style setting can be omitted in this way.

And to the style set, "~base-region" and "~key" can be specified as special styles.

A style with the style name "~base-region" (hereinafter referred to as reference style) has information specified for determining a key for specifying the reference for converting a style value specified in a relative unit into an absolute unit. In the present embodiment, the style value of the reference style is any one of "me", "parentkey", "thisks", "parentks" or "page." The style value in the relative unit is converted, on the basis of the width of the key to which the style set name of the style set whereto the reference style is set is specified as an attribute when the style value of the reference style is "me", and on the basis of the width of its parent key when the style value of the reference style is "parentkey." The style value in the relative unit is converted, on the basis of the width of the key set to which the key to which the style set name is set as an attribute belongs (in other words, the K key of the closest level in the ancestors of the key) when the style value of the reference style is "thisks", and on the basis of the width of the key set to which the K key belongs (in other words, the K key of a second closest level in the ancestor of the pertinent key) when the style value of the reference style is "parentks." The style value in the relative unit is converted on the basis of the width of the entire drawing area to where a key set file is output when the style value of the reference style is "page."

The style with a style name of "~key" limits the key to which the style is applied. In this case, one or more keys to be a target of a style is set as the style value with "+" as a separating character, and the style description sentence that indicates the style to be applied is written in the succeeding parentheses. In the example of the key set file 10 of FIG. 1, '~key="Rb+Cb"' is written in style set 14. In this case, the succeeding style is applied to only the key with Rb label and the key with Cb label in the keys specified the "@button" and the descendant keys. Note that, when "all" is specified as the target of the style, this indicates that all types of the keys.

When "~key" is specified, a style is inherited to the key that is set the style set as an attribute and its descendants (the key of those that are indicated by the value of "~key") however, the style is applied only to the key that is specified the style set and not inherited to its descendants when "me" is specified to the value of "~key". Note that, "me" is considered to be set as ~key when specification of "~key" is omitted. For example, in the key set file 10 of FIG. 1, since "~key" is not written in style set 13, processing is performed assuming that "me" is set to it.

Note that, details of the drawing process of the key according to a style will be described later.

Label "U" indicates a key corresponding to the entire drawing area allocated to the key set. The descendant key of the key labeled "U" (hereinafter referred to as the U key) is allocated thereto at least a part of the drawing area corresponding to the U key. In principle, there is one U key included in the key set file. The key set file 10 of FIG. 1 also has only one U key 21.

The keys being descendants of the U key are labeled "R", "Rb", "C", "Cb" or "I". Note that, keys labeled besides these are capable of being descendants of the U key however, for the purpose of simplifying the explanation, the descendant keys of the U key are assumed to be labeled "R", "Rb", "C", "Cb" or "I" in the present embodiment.

Keys that are labeled R or Rb (hereinafter referred to as the R key) and keys that are labeled C or Cb (hereinafter referred to as the C key) are called layout keys. The layout key indicates splitting of the drawing area allocated to the parent key. The R key indicates splitting of the drawing area allocated to the parent key into rows and the C key indicates splitting into columns.

A character string and a style set name can be set to the layout key as attributes. In the example of the key set file 10, for example, the first R key 22 of the R keys being child of the U key has a character string "0" and a style set name "@label" set as attributes.

The layout key indicates that the parent's drawing area is equally split into a number according to the number of brother keys. For example, when the key string is "U{RR}", the drawing area indicated by the U key is split into two vertically, and when the key string is "U{CCC}", the drawing area indicated by the U key is split into three horizontally.

A numerical value can be written after "R", "Rb", "C" or "Cb". In this case, the numerical value (hereinafter referred to as specified value) that comes after the label indicates the splitting rate of the drawing area. As in the example of the key set file 10, when the key string is "U{RR4}", the drawing area indicated by the U key is split into two, a fifth and four fifths vertically. Note that, when the description on the specified number is omitted, it is considered that "1" is written as the specified number. In other words, the above-mentioned key string "U{RR4}" means the same as "U{R1R4}".

Note that, an R key and a C key do not exist in the same level in the present embodiment.

A style is allocated for every layout key. Every layout key inherits the style allocated for their parent key and when a style set name is specified as an attribute of the layout key, the style specified to the style set name is also allocated.

Each key is drawn in a specified style in the allocated drawing area. Note that, the drawing process of the key will be described later in detail.

Label "I" indicates a key for linking the other key set together. When a key labeled I (hereinafter referred to as I key) is included in the key string, the key set file which is indicated by the key set name (in the present embodiment, the file name of the key set file matches the key set name) or the URL (Uniform Resource Locator) set to the attribute of the I key is read and the key included in the key set file that is read is linked as a child of the I key.

For example, when there exists a key set A described by a key string of 'K("A"){U{RR{I("B")}}}' and a key set B described by a key string of 'K("B"){U{CC}}', the key set B is linked to key set A and the key string becomes "K{U{RR{I{K{U{CC}}}}}}".

In the example of key set file 10, URL "http://server/kbd.ks" is set as an attribute to the I key 25. The key set file indicated by this URL is acquired and the key string included in the key set file is linked as a child of the I key 25.

In this way, the key string included in the key set file specified as an attribute of the I key is linked as a child of the I key so that the style corresponding to the I key is also inherited to the descendants of the I key. Therefore, the keys linked under the I key is drawn with a style that is the same as the I key unless a style set name is particularly specified. Thus, the style of the parts under the I key can be unified even in the case other key set files are linked by the I key.

Hereinafter, the drawing system of the present embodiment will be described in detail.

System Configuration

Figure 3:
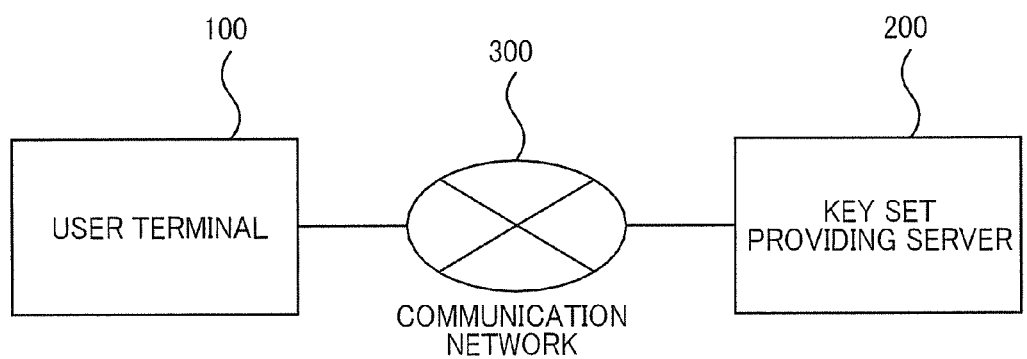
FIG. 3 is a view illustrating an entire configuration of a drawing system according to the present embodiment.

FIG. 3 is a view illustrating an entire configuration of a drawing system according to the present embodiment.

The drawing system of the present embodiment is configured to include a user terminal 100 and a key set providing server 200. The user terminal 100 and the key set providing server 200 are communicably coupled to one another via the communication network 300. The communication network 300 is, for example, the internet or LAN (Local Area Network) and is established by such as the Ethernet (Registered trademark), frame relay network, public telecommunication network, wireless communication network and the like.

The user terminal 100 is, for example, a personal computer, work station, a PDA (Personal Digital Assistance), a mobile phone or a computer such as a POS (Pont Of Sales) terminal, operated by a user. A key set file is stored in the user terminal 100 and the keys included in the key set file are drawn.

The key set providing server 200 is, for example, a personal computer or a computer such as a work station that provides a key set file. The key set providing server 200 sends to the user terminal 100 key set files in response to the request from the user terminal 100. In the present embodiment, the key set providing server 200 has a function of a Web server and sends key set files according to the HTTP (HyperText Transfer Protocol).

The user can operate the user terminal 100 to acquire a key set file by accessing the key set providing server 200 and draw the keys included in the key set file acquired from the key set providing server 200 by the user terminal 100.

Also, when an I key is included in the key string and the URL for accessing to the key set file stored in the key set providing server 200 is specified to the I key, the user terminal 100 can send the request specifying the URL for accessing to the key set providing server 200, receive the key set file responded from the key set providing server 200, and link the key string included in the received key set file as the child of the I key.

Hardware

Figure 4:
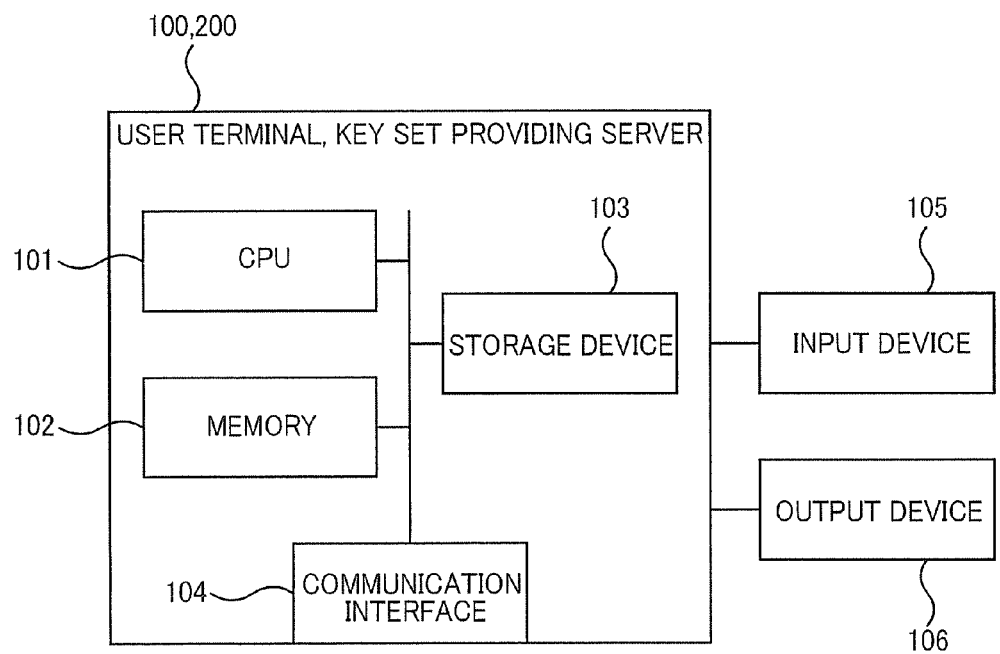
FIG. 4 is a view illustrating a hardware configuration of a user terminal 100 and a key set providing server 200.

FIG. 4 is a view illustrating a hardware configuration of a user terminal 100 and a key set providing server 200. As shown in FIG. 4, the user terminal 100 and the key set providing server 200 each includes a CPU 101, a memory 102, a storage device 103, a communication interface 104, an input device 105 and an output device 106.

The storage device 103 is, for example, a hard disk drive, a CD-ROM drive, a flash memory and the like which stores various programs and data. The CPU 101 implements various functions by reading programs stored in the storage device 103 to the memory 102 and executing them. The communication interface 104 is an interface for connecting to the communication network 300. The communication interface 104 is, for example, an adapter for connecting to the Ethernet (Registered trademark), a modem for connecting to a public telecommunication network or a wireless communication tool.

The input device 105 is, for example, a keyboard, mouse, a touch panel or the like that receives data input. The output device 106 is, for example, a display, a printer and the like that outputs data.

Key Set Providing Server 200

Figure 5:
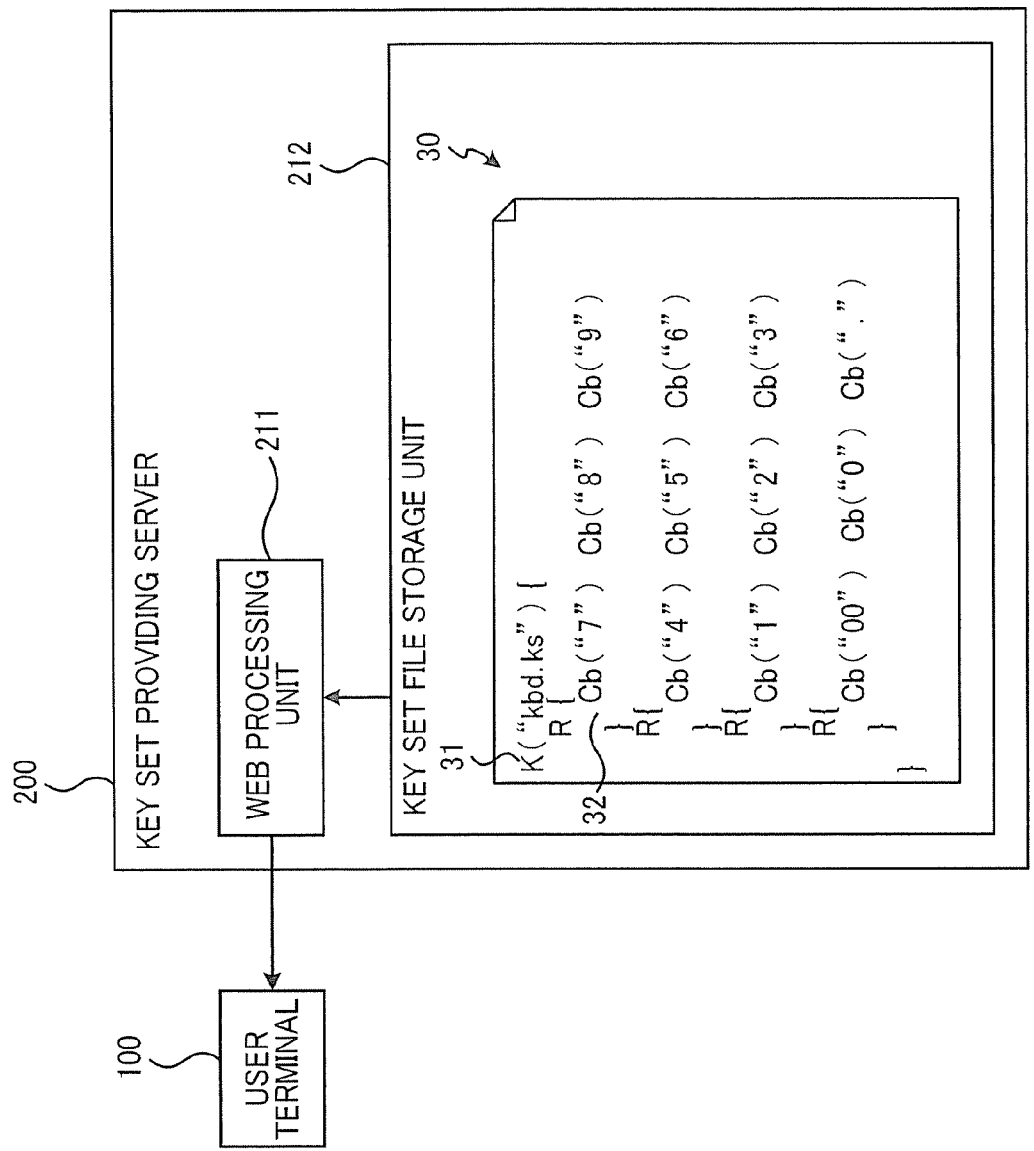
FIG. 5 is a functional block diagram of the key set providing server 200.

FIG. 5 is a functional block diagram of the key set providing server 200.

As in the description above, the key set providing server 200 includes a web processing unit 211 that provides a function of a common web server, and a key set file storage unit 212.

A key set file is stored in the key set file storage unit 212. In the present embodiment, key set file 30 with the name of "kbd.ks" is stored in the key set file storage unit 212. As shown in FIG. 5, the key set file 30 has a tree structure with key K ("kdb.ks") as the root. In the present embodiment, the URL of the key set file 30 is assumed to be "http://server/kbd.ks".

Note that, the web processing unit 211 is implemented by reading programs stored in the storage unit 103 included in the key set providing server 200 and executing them by the CPU 101. The key set file storage unit 212 is implemented as a storage area provided by the memory 102 and the storage unit 103. The key set file storage unit 212 can be implemented as, for example, a directory of the file system provided by the operating system operated by the key set providing server 200.

User Terminal 100

Figure 6:
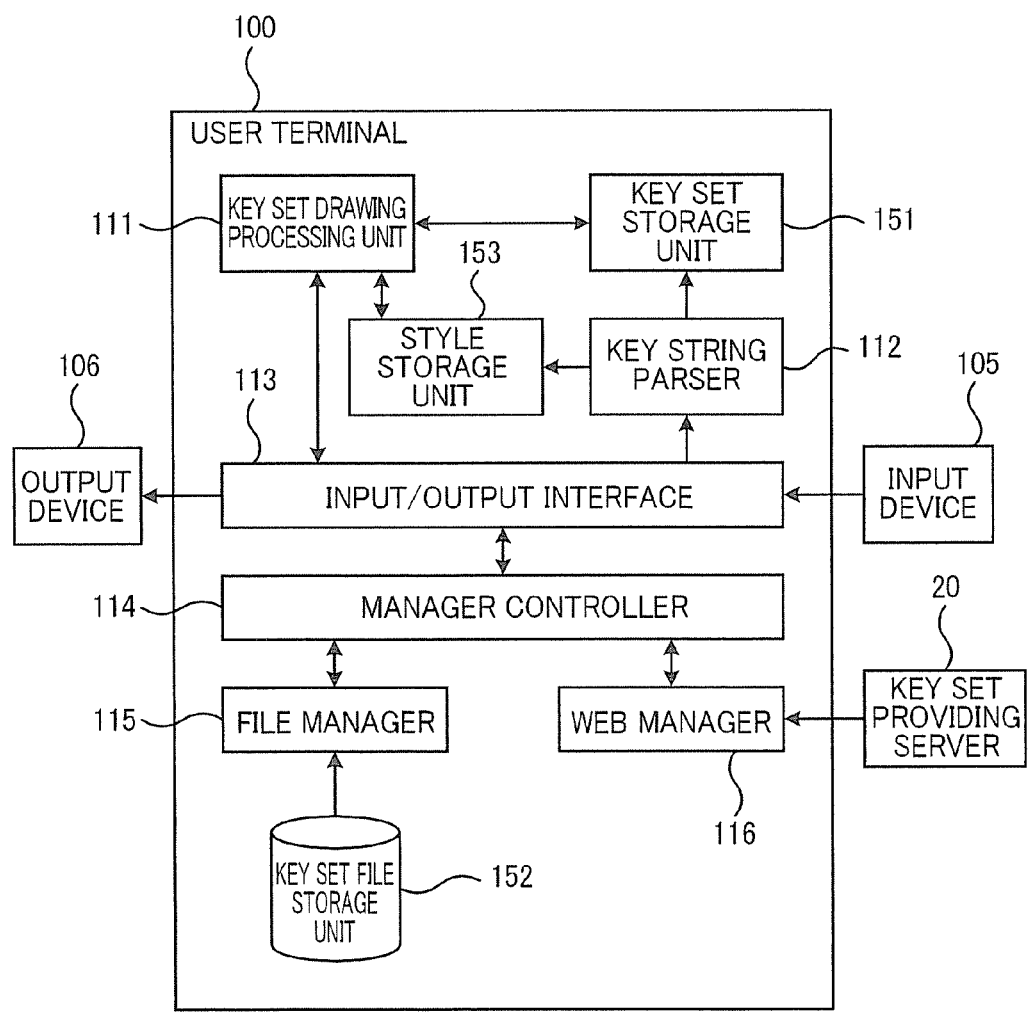
FIG. 6 is a functional block diagram of the user terminal 100.

FIG. 6 is a functional block diagram of the user terminal 100.

The user terminal 100 includes a key set drawing processing unit 111, a key string parser 112, an input/output interface 113, a manager controller 114, a file manager 115, a web manager 116, a key set storage unit 151, a key set file storage unit 152 and a style storage unit 153.

Note that, the key set drawing processing unit 111, the key string parser 112, the input/output interface 113, the manager controller 114, the file manager 115 and the web manager 116 are implemented by reading programs stored in the storage unit 103 included in the user terminal 100 and executing them by the CPU 101. The key set storage unit 151, the key set file storage unit 152 and the style storage unit 153 are implemented as storage areas provided by the memory 102 and the storage unit 103.

The key set file storage unit 152 stores key set files. In the present embodiment, the key set file 10 shown in FIG. 1 is stored in the key set file storage unit 152 however, as a matter of course, other key set files may be stored. The key set file storage unit 152 can be implemented as, for example, a directory of a file system.

The file manager 115 receives a specification of a file name and reads out from the key set file storage unit 152 the key set file indicated by the specified file name.

The web manager 116 receives a URL and acquires from the key set providing server 200 the key set file indicated by the URL. The web manager 116 sends to the key set providing server 200 an HTTP request to which the URL received is set, and receives from the key set providing server 200 a key set file sent as a response to the HTTP request.

The manager controller 114 (corresponding to the document acquiring portion of the present invention) controls the file manager 115 and the web manager 116. The manager controller 114 receives the key set name and according to the received key set name, gives the key set name to the file manager 115 or the web manager 116 and calls it out to acquire the key set file. For example, when the key set name starts with "http://", the manager controller 114 can call the web manager 116 and otherwise, the manager controller 114 can call the file manager 115.

Note that in the present embodiment, the file manager 115 performs reading of files from the file system and the web manager 116 receives the key set file by the HTTP from the key set providing server 200. However, there can be provided, for example, an FTP (File Transfer Protocol) manager that acquires key set files from the FTP server, an electronic mail manager that receives a key set file by electronic mail, an input device manager that generates key set files including the received key string, and the like.

The key string parser 112 (corresponding to the document linking portion of the present invention) reads the key set file 10 stored in the key set file storage unit 152 and analyzes the read key string included in the key set file 10 to generate data indicating the key of the tree structure (hereinafter referred to as the key tree structure.) The key string parser 112 stores the generated key tree structure into the key set storage unit 151. Note that, a key tree structure can, for example, express the keys as objects on the memory and express parent and child relations between objects with pointers and references.

When an I key is included in the key string, the key string parser 112 gives a key set name set as the attribute of the I key to call the manager controller 114. The key string parser 112 acquires a key set file from the manager controller 114, analyzes the key string included in the acquired key set file to generate a key tree structure, and connect the root of the generated key tree structure so that it becomes the child of the I key.

Figure 7:
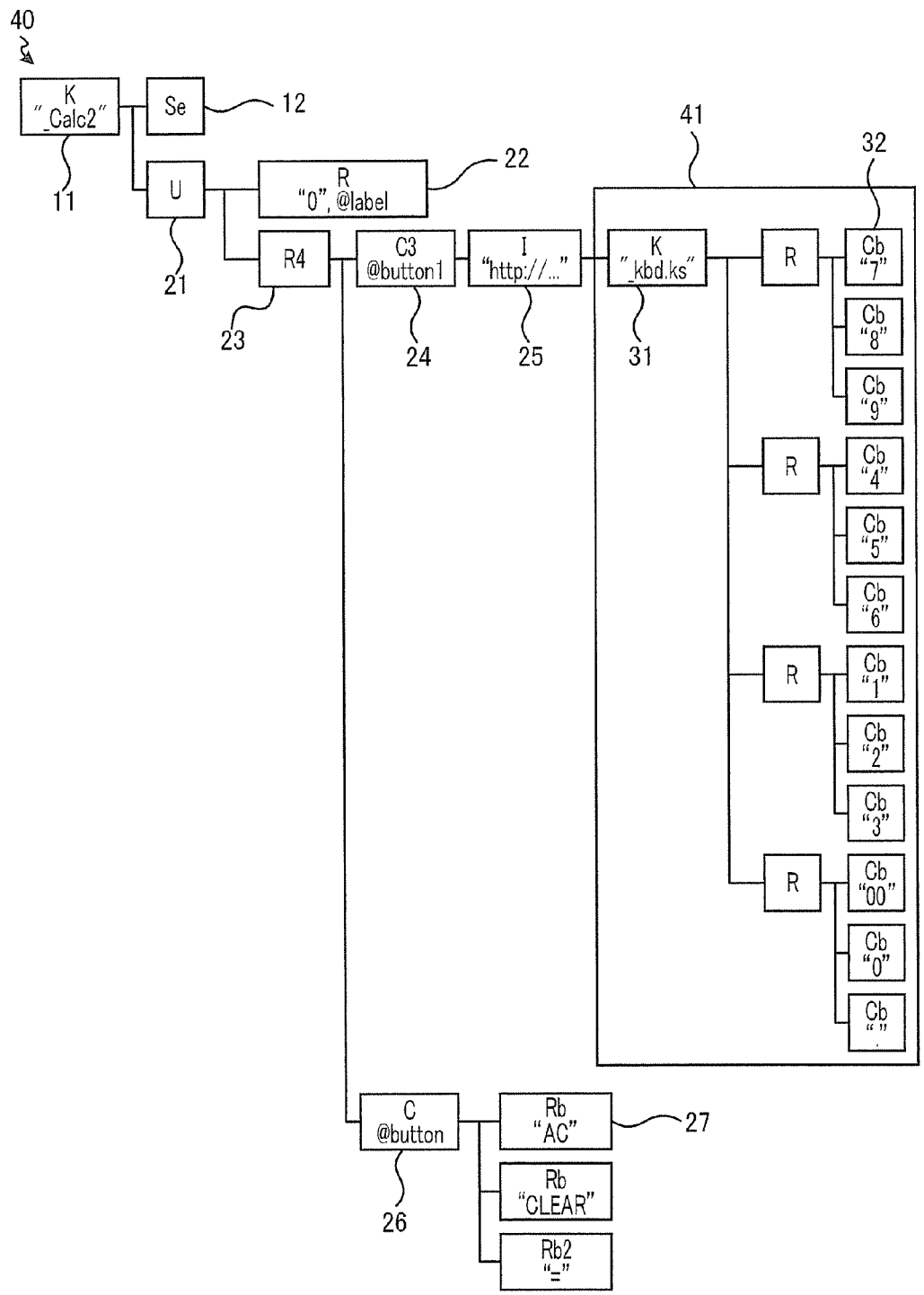
FIG. 7 is a view explaining the structure of a key tree structure 40.

FIG. 7 is a view explaining the structure of the key tree structure 40 that is a result of analyzing the key set file 10 shown in FIG. 1 by the key string parser 112. As shown in FIG. 7, the I key 25 included in the key tree structure 40 has a K key 31 linked thereto, as its child. The key tree structure 41 including the K key and thereunder is the result of analyzing the key string of the key set file 30 provided by the key set providing server 200.

The key set drawing processing unit 111 outputs to the output device 106 character strings based on the key tree structure stored in the key set storage unit 151. Note that, details of the process by the key set drawing processing unit 111 will be described later.

The key string parser 112 stores in the style storage unit 153 information indicating the style applied to the key (hereinafter referred to as style information) based on the style key included in the key set file.

FIG. 8 is a view illustrating a configuration example of the style information stored in style storage 153. As shown in FIG. 8, the style information includes style set name, the target of style application, and the value of the applying style. The label of the key to which the style is applied and the name of the style is included in the target of style application. When "me" is specified as the label, this indicates that the style is applied only to the key specified the style set name, and the style is not inherited to the keys of its descendants. When "all" is specified as the label, this indicates that the style is applied to all keys. For example, in the example of FIG. 10, "me~fontsize" and "Rb~fontsize" are indicated as the target of style application relating to the drawing position (~align).

Note that, the style information whose style set name is "default" is assumed to be stored in advance in the style storage unit 153, as the default of all styles used for drawing. As mentioned above, the styles used for drawing in the present embodiment are only five types, being "~margin", "~padding", "~border", "~fontsize", and "~base~region". And the style information including the target of application specified with labels of "all", "R", "Rb", "C", and "Cb" to the five types of styles names, are registered to correspond to the "default" style set name in the example of FIG. 8.

Figure 9:
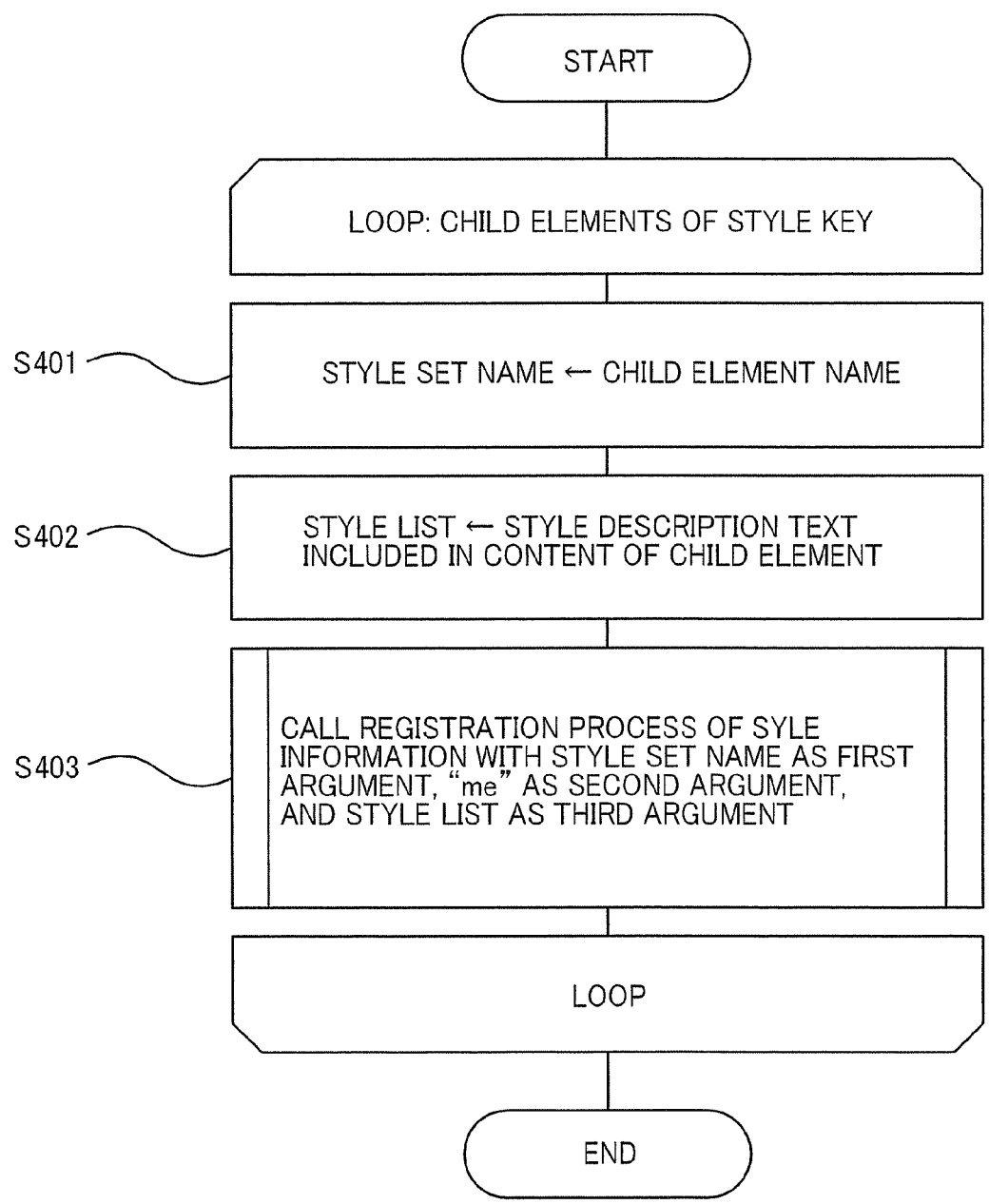
FIG. 9 is a view illustrating a flow of a style registration process.

FIG. 9 is a view illustrating a flow of a style registration process performed by the key string parser 112. The key string parser 112 performs the following processes to each of the child elements of the style key.

The key string parser 112 sets the element name of the child element as a style set name (S401), extracts a style description sentence written as the content of the child element and sets it as a style list (S402). The key string parser 112 calls the registration process of the style information shown in FIG. 10 with the style set name as the first argument, "me" as the second argument and the style list as the third argument (S403).

Figure 10:
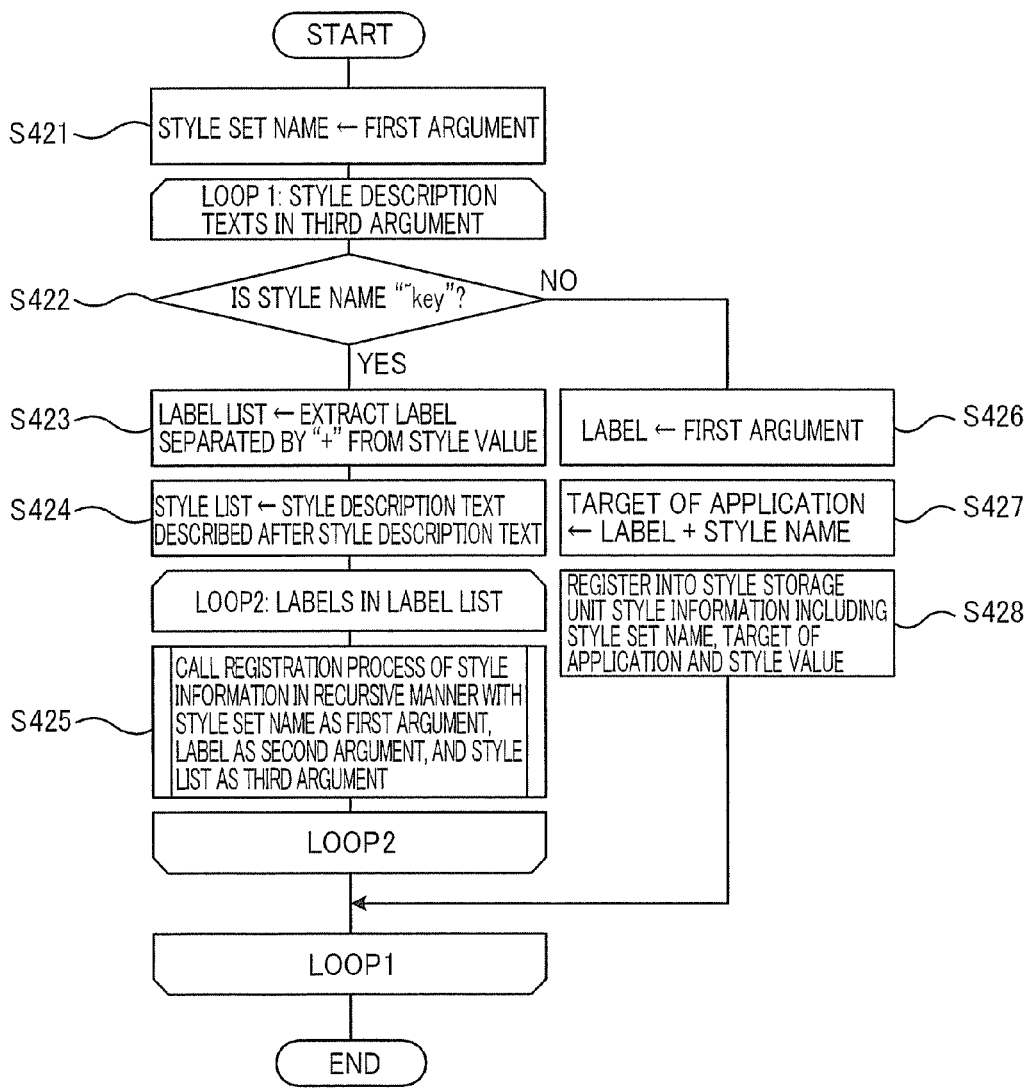
FIG. 10 is a view illustrating a flow of a style information registration process.

In the registration process of the style information shown in FIG. 10, the key string parser 112 sets the first argument as the style set name (S421) and performs the following processes on each style description sentence included in the third argument.

When the style name written in the style description sentence is "~key" (S422: YES), the key string parser 112 extracts a list of labels separated by "+" from the style value written in the style description sentence and sets it as a label list (S423). Note that, when "+" is not included in the style value, a label list including only a single label is generated.

The key string parser 112 extracts the style description sentence described in parentheses following the style description sentence and sets it as a style list (S424), and with regard to each label included in the above-mentioned label list, calls the pertinent registration process recursively with the style set name as the first argument, the label as the second argument and the style list as the third argument.

On the other hand, when the style name is not "~key", (S422: NO), the key string parser 112 sets the first argument as the label (S426), sets the character string created by linking the label and the style name described in the style description sentence as the target of application, and generates style information including the style set name, the target of application and the style value written in the style description sentence to register in the style storage unit 153 (S428).

By performing the above-mentioned process on each style description sentence included in the third argument, the style information such as that shown in FIG. 8 is registered in the style storage unit 153.

The input/output interface 113 controls input of data from the input device 105, output of data to the output device 106 and communication of data between the manger controller 114.

Drawing Process of Keys

Drawing process of the key in the user terminal 100 will be explained in the following description. Note that in the following process, the key tree structure 40 is generated by the key string parser 112 in advance, and the style specified to the style key 12 is registered in the style storage unit 153 to correspond to the style set name. In the present embodiment, the character string is drawn in advance with a predetermined font.

Figure 11:
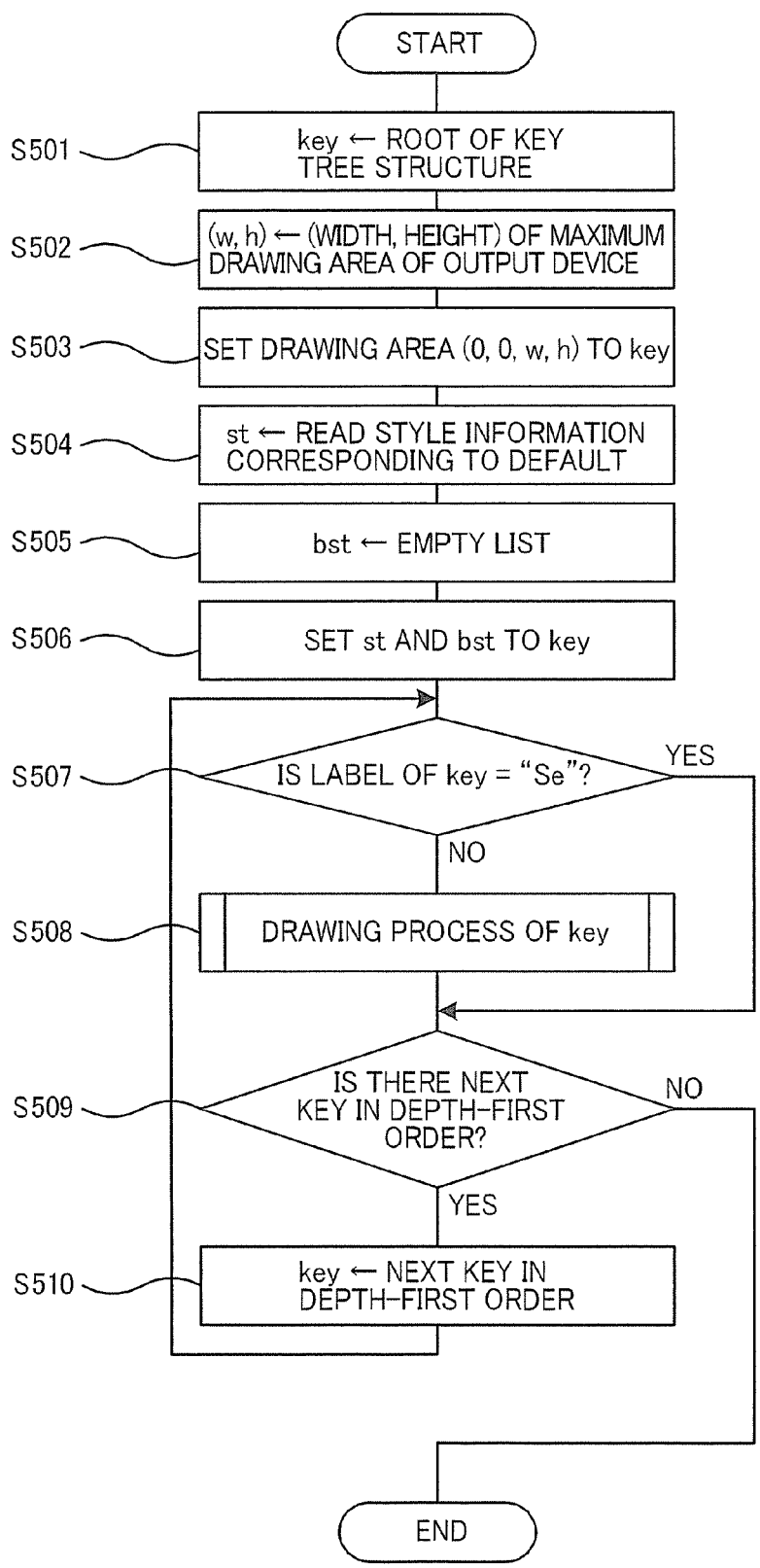
FIG. 11 is a view explaining a flow of a key drawing process.

FIG. 11 is a view explaining a flow of the key drawing process in the user terminal 100. As shown in FIG. 11, the key set drawing processing unit 111 sets the key (the K key 11 in the example of FIG. 7) which is the root of the key tree structure 40 to a variable KEY (S501).

The key set drawing processing unit 111 acquires the maximum drawing area that can be drawn to the output device 106, and sets the width and the height of the acquired drawing area as w and h, respectively (S502). In the present embodiment, the drawing area is rectangular and is represented as "(X coordinate, Y coordinate, width, height)" with the upper left corner of the rectangle as the reference coordinate (0, 0).

The key set drawing processing unit 111 sets the drawing area (0, 0, w, h) to the KEY (S503). Note that the key set drawing processing unit 111 sets, for example, the drawing area to the attribute of the KEY.

The key set drawing processing unit 111 reads the style information whose style set name is "default" from the style storage unit 153 and sets the list of the style information (hereinafter referred to as style list) read as st (S504). And the key set drawing processing unit 111 sets an empty list as bst to which information that indicates which key the style set is set (hereinafter referred to as style reference information) is to be registered (S505). The key set drawing processing unit 111 sets st and bst to the KEY (S506).

When the label of the KEY is not "Se" (S507: NO), the key set drawing processing unit 111 executes the drawing process of the KEY in FIG. 12, to be described later (S508).

When a next key is included in the depth-first order in the key tree structure 40 on the basis of the KEY (S509: YES), the key set drawing processing unit 111 sets the next key as the KEY (S510) and when the label of the KEY is not "Se" (S507: NO), the key set drawing processing unit 111 performs drawing process of the KEY (S508).

As in the above description, the key set drawing processing unit 111 performs drawing process of step S505 on the respective keys besides the style key included in the key tree structure 40 in the depth-first order. Therefore, the key set drawing processing unit 111 can perform drawing process on all keys included in the key tree structure 40 except the style key. In other words all keys besides the style key written in the key set file 30 linked to the key set file 10 is drawn.

Figure 12:
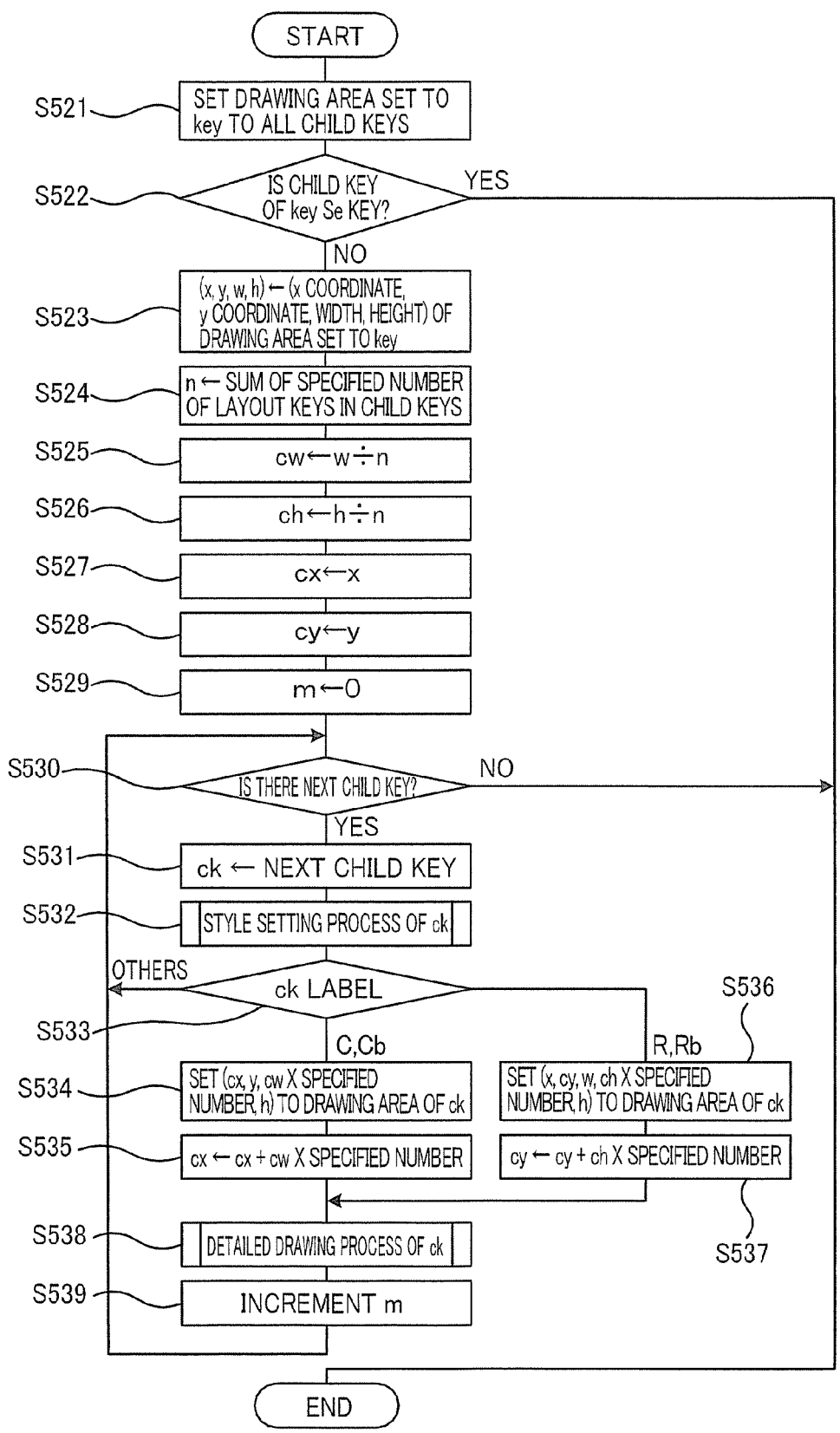
FIG. 12 is a view illustrating a flow of a drawing process of a key at step S508 of FIG. 11.

FIG. 12 is a view illustrating a flow of a drawing process of the KEY in step S508 of FIG. 11.

First, the key set drawing processing unit 111 sets the drawing area set to the KEY to each key which is the child of the key (hereinafter referred to as child key) in the key tree structure 40 (S521).

Next, the key set drawing processing unit 111 determines whether or not a layout key is included in the child keys of the KEY (S522), and ends the process when a layout key is not included in the child key (S522: NO).

When there is a layout key in the child keys of the KEY (S522: YES), the key set drawing processing unit 111 sets the X coordinate, Y coordinate, width and height of the drawing area set to the KEY as x, y, w, h (S523). The key set drawing processing unit 111 sets the sum of the specified numbers of the layout keys in the child keys as n (S524). The key set drawing processing unit 111 sets the quotient obtained by dividing w by n as cw (S525), and sets the quotient obtained by dividing h by n as ch (S526). The key set drawing processing unit 111 sets x to cx (S527), y to cy (S528), and sets 0 to variable m (S529) and performs the following processes while the next child key exists (S530: YES).

Figure 13:
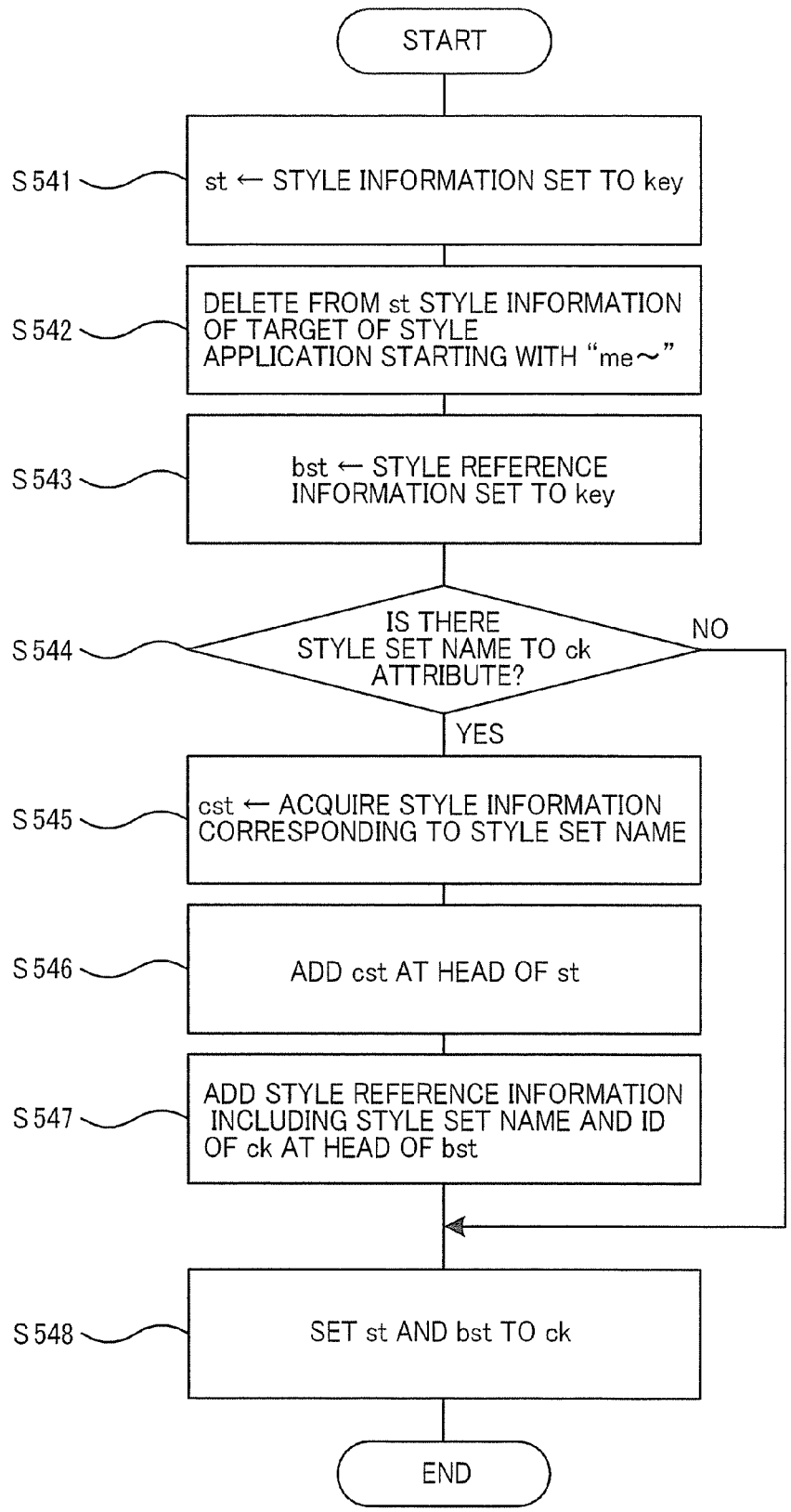
FIG. 13 is a view illustrating a flow of a style setting process of ck at step S530 of FIG. 12.

The key set drawing processing unit 111 sets the next child key to ck (S531) and performs the style setting process of ck shown in FIG. 13 (S532).

In the style setting process of ck, first, the key set drawing processing unit 111 sets the style list set to the KEY being the parent key of ck as st (S541), and deletes from st the style information with the target of style application that starts with "me~" (S542), as shown in FIG. 13. The key set drawing processing unit 111 sets the style reference list set to the KEY as bst (S543).

When a style set name is set to the attribute of ck (S544: YES), the key set drawing processing unit 111 reads from the style storage unit 153 style information corresponding to the style set name set to the attribute of ck, sets the style list that is read as cst (S545), and adds cst to the head of st (S546).

Figure 14:
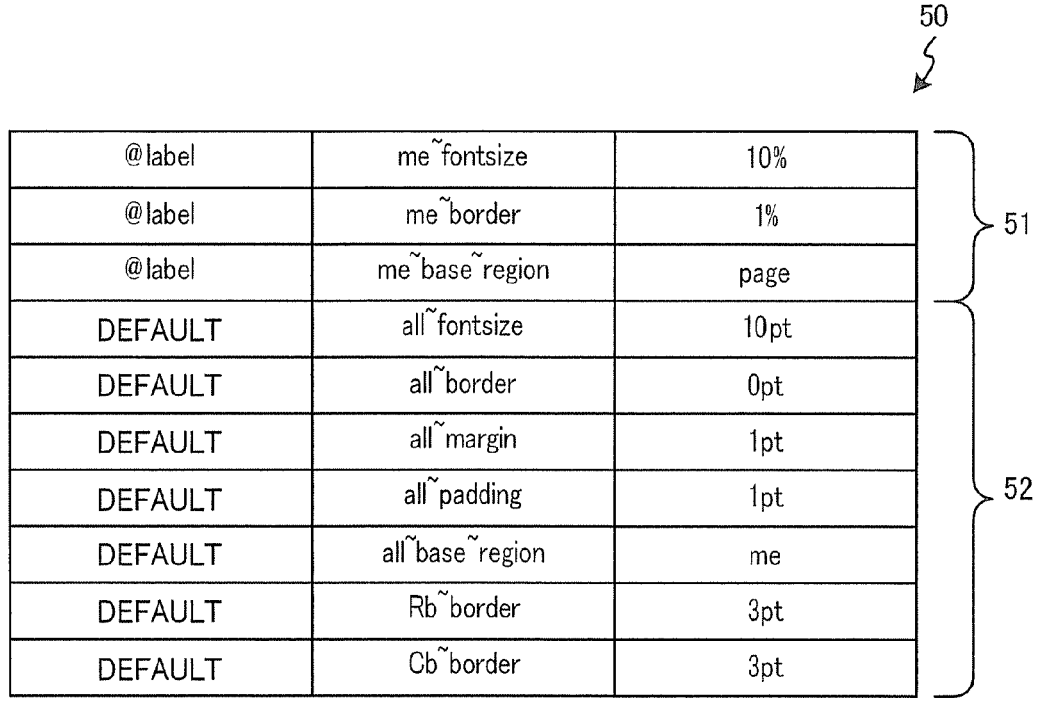
FIG. 14 is a view illustrating a configuration example of style list st generated in the style setting process of ck.

A configuration example of the st generated here is shown in FIG. 14. FIG. 14 shows an example of the style list 50 (st) generated on the R key 22 described in the key set file 10 of FIG. 1. The style information 52 is the default style information set to the K key 11 that is the root. Since the style set name "@label" is set to the attribute of the R key 22, the style information 51 that corresponds to "@label" is added to the head of the list.

Figure 15:
FIG. 15 is a view illustrating a configuration example of style reference list bst generated in the style setting process of ck.

The key set drawing processing unit 111 generates style reference information including identification information (hereinafter referred to as key ID, for example, when the key is represented as an object, the key ID can be a pointer or a reference to the object, or the key ID can be uniquely allocated to the object) of ck associated with the style set name set to the attribute of ck and adds it to the head of bst (S547). An example of the style reference list 60 (bst) generated here is shown in FIG. 15. As shown in FIG. 15, the key ID of ck to which the style set name is set to its attribute is registered associated with the style set name.

Lastly, the key set drawing processing unit 111 set st and bst to ck (S548).

In the above-described manner, when a style set name is set to the attribute of ck, a style list, where the style information corresponding to the style set name set to the attribute of ck is added to the head of the style list set to the parent KEY, is set to ck, and when a style set name is not set to the attribute of ck, the style list set to the parent KEY is set to ck as it is. In this way, the style of each key is inherited from the parent in the key tree structure 40. When a style set name is set to the attribute of ck, the style set name and the key ID of ck is registered to the head of the style reference list set to the parent key, and the style reference list is also inherited from parent to child.

Returning to FIG. 12, when the label of ck is "C" or "Cb" (S533: C, Cb), the key set drawing processing unit 111 sets as a drawing area of (cx, y, cw*specified number, h) to ck (S534) and adds the computational result of cw*(specified number of ck) to cx (S535). When the label of ck is "R" or "Rb" (S533: R, Rb), the key set drawing processing unit 111 sets the area of (x, cy, w, ch X specified number) to ck as a drawing area (S536) and adds the computational result of ch*(specified number of ck) to cy (S537). In the aforementioned manner, when ck is a C key, the drawing area of the KEY divided into n sections in the x axis direction is set to ck, and when ck is an R key, the drawing area of the KEY divided into n sections in the y axis direction is set to ck.

On the other hand, the key set drawing processing unit 111 repeats processes from step S530 when the label of ck is neither "C", "Cb", "R", nor "Rb" (S533: others).

When the label of ck is "C", "Cb", "R", or "Rb" (S533: C, Cb, S533: R, Rb), the key set drawing processing unit 111 performs the drawing process of ck shown in FIG. 16 (S535).

Figure 17:
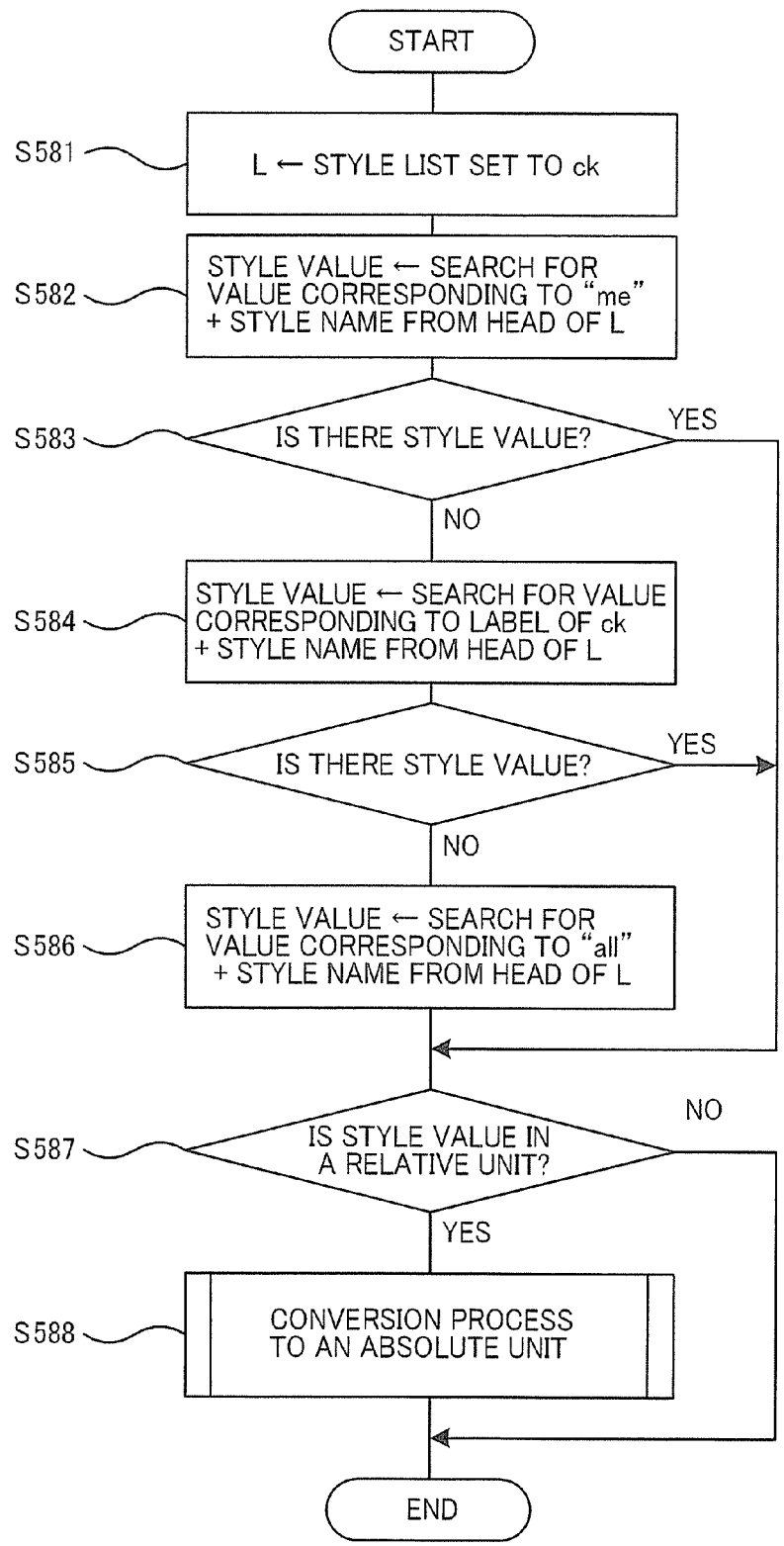
FIG. 17 is a view illustrating a flow of a style value acquiring process.

The key set drawing processing unit 111 performs a style value acquiring process shown in FIG. 17 with "~margin" indicating the margin as the style name and sets its result as m (S561).

In the style value acquiring process shown in FIG. 17, the key set drawing processing unit 111 sets the style list set to ck as L (S581), and searches for the style value corresponding to the character string with a style name linked to "me" from the head of L (S582).

When the above-described style value is found (S583: YES), the key set drawing processing unit 111 ends the process, and when the above-described style value is not found (S583: NO), searches for the style value corresponding to the character string with the style name linked to the label of ck from the head of L (S584).

When the above-described style information is found (S585: YES), the key set drawing processing unit 111 ends the process, and when the above-described style information is not found (S585: NO), searches for the style value corresponding to the character string with a style name linked to "all" from the head of L (S586).

Note that in the present embodiment, the default style value corresponding to all style names is registered, in the style storage unit 153, as the style information of the target of style application that has "all" linked to the style name and assumes that the style value is reliably searched by the above-described process.

The key set drawing processing unit 111 determines whether the style value is specified in an absolute unit or specified in a relative unit (S587). When the style value is specified in the relative unit, that is, when the character string specified as the style value ends with "%" (S587), the key set drawing processing unit 111 converts the style value from the relative unit to the absolute unit by the style value conversion process shown in FIG. 18.

Figure 18:
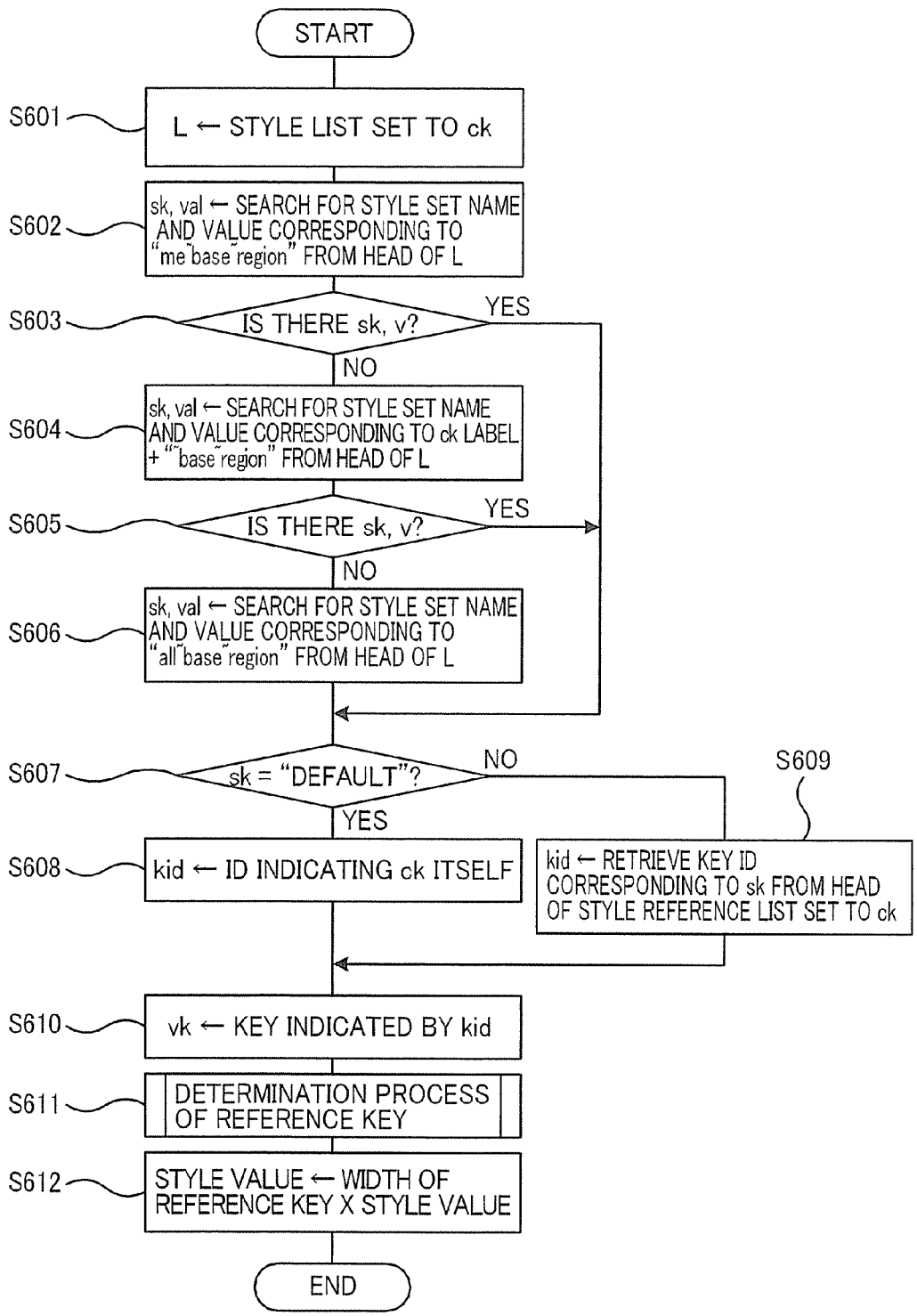
FIG. 18 is a view illustrating a flow of a style value conversion process.

In the conversion process of FIG. 18, the key set drawing processing unit 111 sets the style list set to ck as L (S601), searches from the head of L the style set name and value corresponding to "me~base~region" as sk and val, respectively (S602).

When the key set drawing processing unit 111 fails to find the above-mentioned sk and val (S603: NO), searches for a style set name corresponding to the character string with "~base~region" coupled to the label of ck, and value thereof as sk and val from the head of L (S604).

When the key set drawing processing unit 111 fails to find the above-mentioned sk and val (S605: NO), searches for the style set name corresponding to "all~base~region", and value thereof as sk and val from the head of L (S606).

Note that in the present embodiment, a default value of "all~base~region" is stored in the style storage unit 153 to correspond to the style name of "default" in advance and the key set drawing processing unit 111 reliably acquires sk and val by the above-described process.

When sk is "default" (S607: YES), the key set drawing processing unit 111 sets the key ID of ck as kid (S608) and when sk is not "default" (S607: NO), the key set drawing processing unit 111 acquires the key ID corresponding to sk as kid from the head of the style reference list set to ck (S609).

Figure 19:
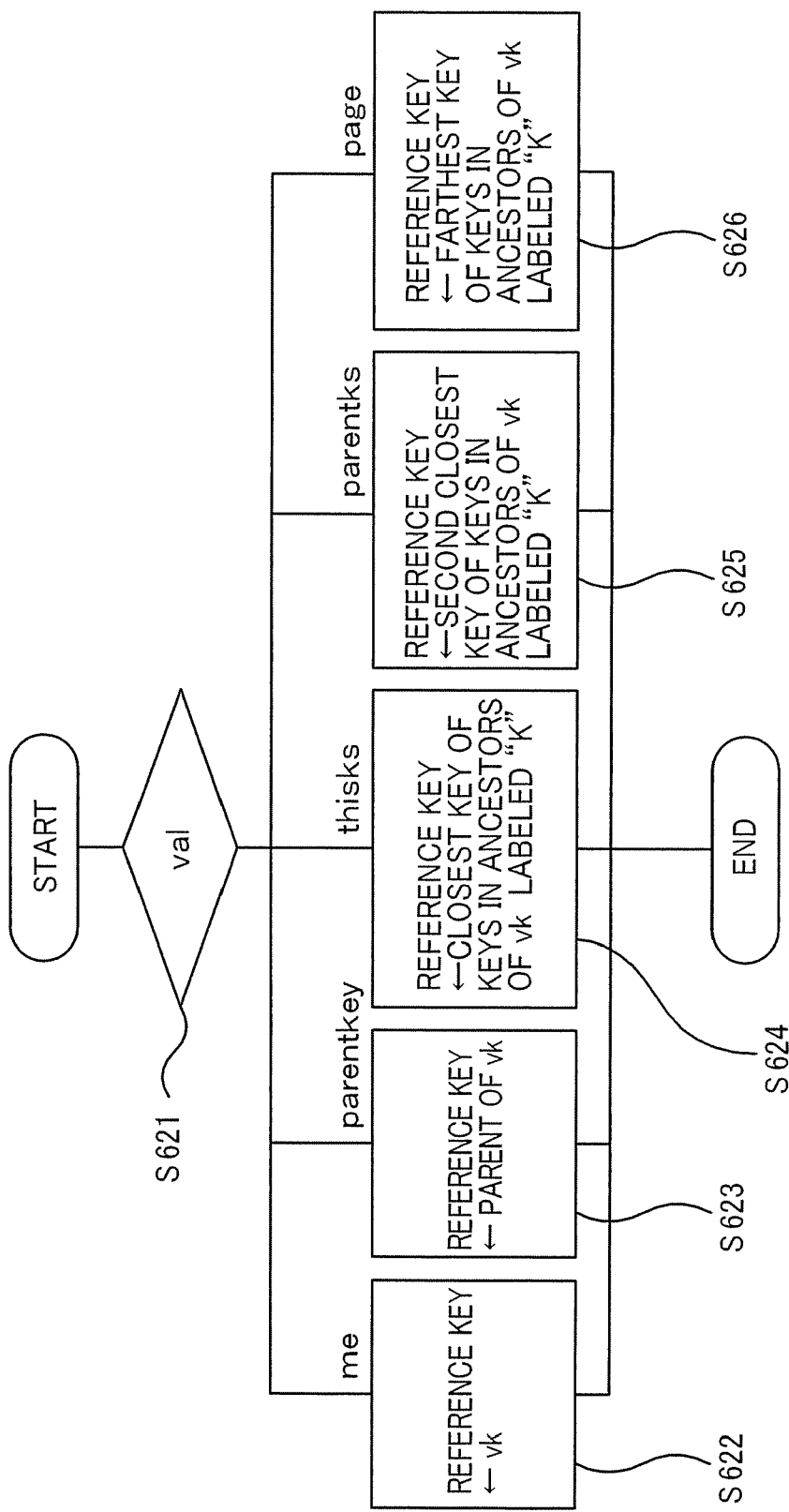
FIG. 19 is a view illustrating a flow of a reference key specifying process.

The key set drawing processing unit 111 sets the key indicated by kid as vk (S610) and performs the specific process of the reference key shown in FIG. 19 according to val retrieved by the above-described process (S611).

As shown in FIG. 19, when val is "me" (S621: me) the key set drawing processing unit 111 sets vk as the reference key (S622), and when val is "parentkey" (S621: parent key) sets the parent key of vk as the reference key (S623).

When val is "thisks" (S621: thisks) the key set drawing processing unit 111 retrieves the K key belonging to the closest level in the ancestor keys of vk and sets it as reference key (S624). When val is "parentks" (S622: parentks) the key set drawing processing unit 111 retrieves the K key belonging to the second closest level of the ancestor keys of vk and sets it as reference key (S625). Note that, when there is only one K key in the ancestors keys of vk, the K key can be set as reference key.

When val is "page" (S621: page) the key set drawing processing unit 111 retrieves the K key belonging to the farthest level of the ancestor keys of vk and sets it as reference key (S626).

When the key set drawing processing unit 111 determines the reference key by the above-described process, acquires the width (w) of the area included in the determined reference key and sets the value obtained by multiplying the acquired width by the style value specified in percentages (%) as the style value (S612).

In this way, the style value specified in the relative unit is converted to the value in the absolute unit on the basis of the width of the reference key.

Next, the key set drawing processing unit 111 performs the style value acquiring process shown in the above-described FIG. 17 with the style name set as "~border" indicating the border, and sets the result as b (S562).

The key set drawing processing unit 111 acquires the X coordinate, Y coordinate, width and height of the drawing area set to ck, as dx, dy, dw and dh, respectively (S563). The key set drawing processing unit 111 adds m to dx and dy, respectively (S564), subtracts twice the value of m from each of dw and dh respectively(S565), and calculates the rectangle that is inside the drawing area set to ck by the margin. The key set drawing processing unit 111 draws this rectangle (dx, dy, dw, dh) with line width of b (S566).

When a character string is set to the attribute of ck (S567: YES) the key set drawing processing unit 111 performs the style value acquiring process shown in the above-described FIG. 17 with the style name as "~fontsize" indicating the font size, and sets the result as f (S568). The key set drawing processing unit 111 also performs the style value acquiring process shown in the above-described FIG. 17 with the style name as "~padding" indicating padding, and sets the result as p (S569). The key set drawing processing unit 111 adds b and p to both dx and dy (S570) and subtracts a value twice the sum of b and p from both dw and dh (S571), and calculates the area inside the above-described rectangle by a width of the border and padding. The key set drawing processing 111 sets the character string set to the attribute of ck as t (S572) and draws the character string t inside the calculated area (dx, dy, dw, dh) with font size of f (S573).

Figure 20:
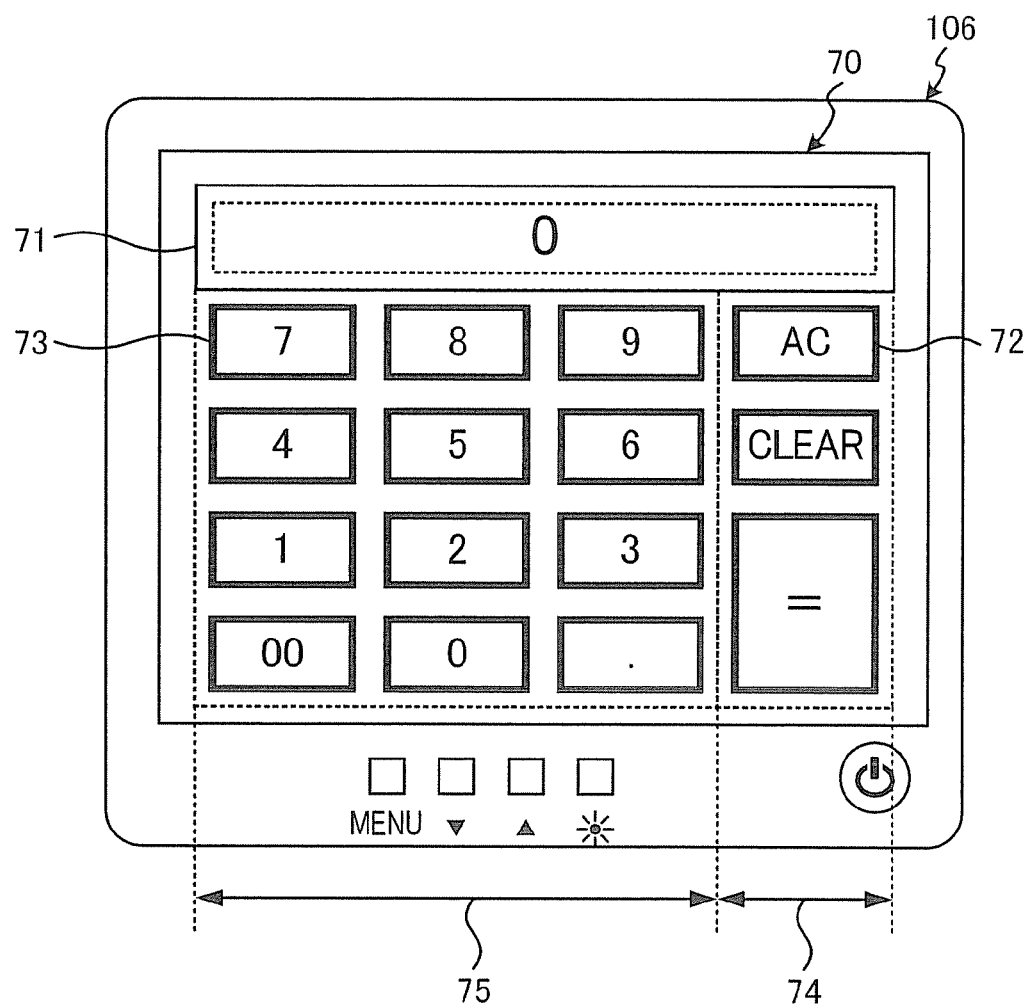
FIG. 20 is a view illustrating an example of screen 70 with the key set file 10 drawn.

FIG. 20 is a view illustrating an example of screen 70 with a key set file 10 drawn by the above process. In FIG. 20, the output device 106 is a display device such as a display and shows an example where the key set file 10 indicated in FIG. 1 is drawn on the screen of the display device.

As shown in FIG. 20, the R key 22 is drawn as the graphic 71 on the screen 70. In the R key 22, the style set 13 with the style set name "@label" is specified, and in the style set 13, the font size is set as "7%", the border as "1%", and padding as "1%". The margin that is not set to the style set 13 is set as "0 pt" from the default style information stored in the style storage unit 153 and inherited from the K key 11 of the root to the R key 22. Since the style value of the reference style is set as "page" in style set 13, the style specified in the relative unit is converted to the absolute unit with the width of the entire screen 70 as reference.

The R key 27 is drawn as the graphic 72 on the screen 70 and the C key 32 included in the key set file 30 linked to I key 25 is drawn as the graphic 73. Although a style set name is not set to both the R key 27 and the C key 32, the style is inherited from the R key 23 to the R key 27 and the C key 32, respectively, as described above.

The width 74 of the drawing area set to the parent of the R key 27 differs from the width 75 of the drawing area set to the parent of the C key 32. Therefore, when the key is drawn according to the style specified in the relative unit with the drawing area of the parent as reference, the size of the border and margin of the R key 27 and the C key 32 differ.

However, in the drawing system according to the present embodiment, the reference key is determined according to the style value of the reference style corresponding to the R key to which a style set name is specified, and the size specified in the relative unit is calculated as a size in the absolute unit according to the width of the reference key. Accordingly, both the R key 27 and the C key 32 have style values calculated with the area corresponding to the K key 11 to which the R key 23 belongs, so that the R key 27 and the C key 32 are made to have the same look and feel.

As described above, according to the drawing system of the present embodiment, the reference key is determined based on the style reference list set to each key, and the style value in the relative unit is converted to the absolute unit on the basis of the width of the reference key. An identical reference key is determined to all keys when the style value of the reference style is "page", an identical reference key is determined to the descendant keys from a specific K key when the style value of the reference style is "parentks" or "thisks", and an identical reference key is determined to all descendant keys which inherit the style of the key when the style value of the reference style is "parentkey" or "me". In this way, the style value in the relative unit of a plurality of keys are converted on the basis of the width of an identical reference key so that even if the style value was specified in the relative unit, the style of the same size can be applied to these plurality of keys. By converting a style value in the relative unit based on the width of the same reference key in this way, screens of all clients can be set to look alike even when the size of the screens were to differ among clients.

The reference key is determined based on the first key which is specified the style set name (hereinafter referred to as the specified key). That is, the reference key is, the specified key when the style value of the reference style is "me", the parent of the specified key when the style value of the reference style is "parentkey", the closest K key in the ancestors of the specified key when the style value of the reference style is "thisks", the second closest K key in the ancestors of the specified key when the style value of the reference style is "parentks", and the root key if the style value of the reference style is "page". Since the style is inherited from the specified key to its descendants, the style value in the relative unit can be converted based on the same reference key for the keys belonging to the subtree under the specified key unless the reference style is not specified. In this way, a style of the same size can be applied to the subtree under the specified key even if the style value is specified in the relative unit so that the appearance of the entire subtree can be unified. A screen designer can set the style by assuming the reference key of each subtree and specifying the size relative to the width of the reference key, so that screen designing can be performed in a flexible manner while keeping the appearance from converting, even when the screen size changes.

Since the style is inherited to the descendants of the key in the key structure, a designer can easily grasp the area to which the style set to the key will be applied. Therefore, the designer's work can be made more efficient.

Since each layout key is drawn to the entire parent drawing area or a portion thereof, all the layout keys drawn in the drawing area of the parent key to be the reference can be easily unified in the same style. That is, only the parent key needs to be set the style set name when the same style is set to the keys drawn in the same drawing area. Therefore, even if one forgets to set the style set name, the appearance of keys can be unified.

When the key set file 30 is linked to the key set file 10 by the I key, the style of the key in the key set file 10 can be inherited to the key set file 30 linked as the descendant of the I key.

Therefore, style set names need not be described beforehand to the keys in the key set file 30 so that the modularity of the key set file can be improved.

The process in the above-described FIG. 12 is performed to all keys that configure the key tree structure 40 except the style key. Therefore, the whole or a part of the drawing area allocated to the root of the key tree structure 40 is allocated to each key included in the key tree structure 40 except the style key, according to the drawing system of the present embodiment. And drawing of the later described character strings is performed to the allocated drawing area. Thereby, the whole key tree structure 40 will be drawn on a single screen. In other words, keys of all the keys that configure the key tree structure 40, to which character strings to be drawn is set as attributes, can be displayed on a single screen. In this way, the whole list of keys can be securely displayed on a screen.

According to the drawing system of the present embodiment, it is able to make keys configure a tree structure, to allocate the whole drawing area of a screen to the root of the tree structure, and to allocate the whole or a part of the parent drawing area to each key as a drawing area of the key information. Therefore, the screen configuration only has to represent the split state of the screen in a tree structure so that a screen designer can easily describe a screen structure as a key string.

When a style set name is set to the key that indicates an area of a screen, a style is set to the key and the style is inherited to the keys in a lower level that are to be drawn to the area. Therefore, the appearance of a part of the screen can be easily unified.

On the other hand, the type of key to which the style is applied can be restricted by specifying "~key". And by omitting the specification of the key of the target of application or by setting "~key=me", a style can be made to be applied only to a key to which the style set is specified. Therefore, changing the appearance according to the key type, or modifying the appearance of a specific key can be easily realized so that flexible designing can be performed.

Note that the drawing system of the present embodiment was configured to include a user terminal 100 and a key set providing server 200 however, the drawing system can be configured with only the user terminal 100. In this case, the user terminal 100 can display only a key set file stored in the user terminal 100. Reversely, the drawing system can be configured to include a plurality of key set providing servers 200.

In the present embodiment, key sets were stored as files however, key sets can be stored as, for example, records of a database without being in a form of a file.

Also, in the present embodiment, style values specified in the relative unit were converted on the basis of the width of the reference key however, the present invention is not limited to such. The height of the reference key can be set as reference, the smaller or the larger of the width or the height of the reference key can be set as reference, or the average value of the width and the height of the reference key can be set as reference.

The font for displaying a character string was predetermined in the present embodiment however, the font can be specified as a style. In this case, the font is capable of being specified to the style key as style (for example, the style name is set as ~font), and the default font is registered in the style storage unit 153. Further, the key set drawing processing unit 111 acquires a value of the font (~font) from the style list set to ck in step S567 of FIG. 16 and calculate the width and height of the character string t in the case drawing is performed with the acquired font with a font size of f.

In the present embodiment, the key labeled "R" and the key labeled "Rb" as well as the key labeled "C" and the key labeled "Cb" were displayed in the same manner however, for example, the key labeled "Rb" and the key labeled "Cb" can be drawn as buttons.

In the present embodiment, the layout key was labeled with any of the four types of labels "R", "Rb", "C", or "Cb" however, the present invention is not limited to such and various labels can be defined.

In the present embodiment, in the style lists set to each key, the default style information is set at the tail and the style information is arranged in the order of depth of hierarchy so that when the key or the ancestor key is set the same style, the style set to the key closest in distance from the key was applied however, the present invention is not limited to such, and the style set to the farthest in distance from the drawing key in the ancestor keys to which a style is set can be applied when a style set name is not specified to the drawing key which is an object of drawing.

Figure 16:
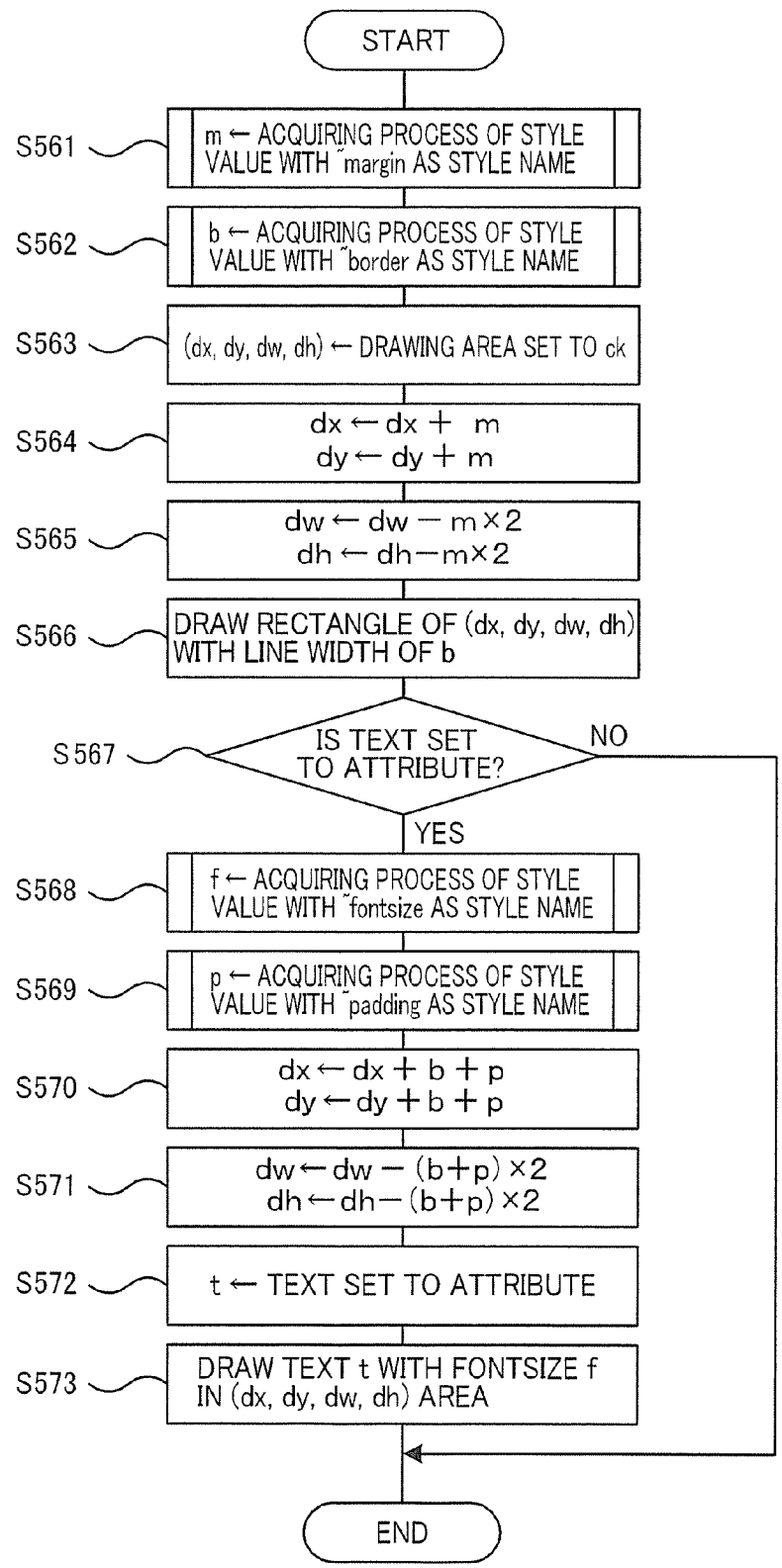
FIG. 16 is a view illustrating a flow of a drawing process of ck at step S535 of FIG. 12.

In this case, for example, the default style information is not included in the style list and the key set drawing processing unit 111 retrieves the value corresponding to the style set name that is set and the style name from the style storage unit 153 if the style set name is set to the drawing key in steps S561, S562, S568 and S569 of FIG. 16. Additionally, when the style set name is not set to the drawing key, or when the value corresponding to the style set name that is set and the style name is not found in the style storage unit 153, the key set drawing processing unit 111 searches for the value corresponding to the style name from the tail end of the style list, and if it still does not find the value, searches for the value corresponding to "default" and the style name from the style storage unit 153.

In this way, when a style is not set to the drawing key, the drawing key is drawn according to the style that is set to the ancestor key farthest from the drawing key, and on the other hand, if a style is set to the drawing key, the drawing key is drawn according to the style that is set. Therefore, since it is able to set the style to a specific parent key to unify the style of the descendant keys as well as to modify the style of only a specific key, it is able to make designing easy.

Embodiments of the present invention has been described above however, it is to be understood that the above embodiment has been explained to facilitate understanding of the present invention but not to limit the scope of the invention. The present invention encompasses various modifications, improvements, and equivalents without departing from the spirit of the present invention.

REFERENCE SIGNS LIST

10: key set file. 30: key set file, 40: key tree structure, 50: style list, 60: style reference list, 70: screen, 80: screen, 100: user terminal, 200: key set providing server, 300: communication terminal, 101: CPU, 102: memory, 103: storage device, 104: communication interface, 105: input device, 106: output device, 111: key set drawing processing unit, 112: key string parser, 113: input/output interface, 114: manager controller, 115: file manager, 116: web manager, 151: key set storage unit, 152: key set file storage unit, 153: style storage unit, 211: web processing unit, 212: key set file storage unit

The invention claimed is:

1. A computer for drawing a structured document in a tree structure, comprising: an area determining portion that allocates a drawing area to each element configuring the structured document; a reference element determining portion that determines a second element to be a root of a subtree to which a first element belongs, when a first style is set to the first element, the first style expressing a format relating to a dimension in a relative unit; a drawing style calculating portion that calculates a second style expressing the first style in an absolute unit on basis of the drawing area allocated to the second element; and an element drawing portion that draws the first element according to the second style.

2. The structured document drawing system according to claim 1, wherein the first style is at least one of a line width to draw a graphic that expresses the first element, a margin to draw the graphic inside the drawing area, a padding to draw a text inside the graphic, and font size to draw the text.

3. The structured document drawing system according to claim 1, wherein the reference element determining portion determines a root of the structured document as the second element.

4. The structured document drawing system according to claim 1 further comprising: a structured document storing portion that stores first structured document; a document acquiring portion that acquires a second structured document when the second structured document is specified to an attribute of the first element included in the first structured document; a document linking portion that links the second structured document to the first structured document to generate the structured document to be a target of drawing, so that a root element of the second structured document becomes a child element of the first element.

5. The structured document drawing system according to claim 4, wherein the reference element determining portion determines a root of the first structured document as the second element when the first element is included in the first structured document, and determines a root of the second structured document as the second element when the first element is included in the second structured document.

6. A method for drawing a structured document in a tree structure, comprising the steps executed by a computer of; allocating a drawing area to each element configuring the structured document; determining a second element to be a root of a subtree to which a first element belongs, when a first style is set to the first element, the first style expressing a format relating to a dimension in a relative unit; calculating a second style expressing the first style in an absolute unit on basis of the drawing area allocated to the second element; and drawing the first element according to the second style.

7. A memory storing a program for drawing a structured document in a tree structure, wherein a computer performs the steps of: allocating a drawing area to each element configuring the structured document; determining a second element to be a root of a subtree to which a first element belongs, when a first style is set to the first element, the first style expressing a format relating to a dimension in a relative unit; calculating a second style expressing the first style in an absolute unit on basis of the drawing area allocated to the second element; and drawing the first element according to the second style.

* * * * *